US012136409B2

(12) United States Patent
Rule

(10) Patent No.: US 12,136,409 B2
(45) **Date of Patent: *Nov. 5, 2024**

(54) MANAGING CHARACTERISTICS OF ACTIVE NOISE REDUCTION

(71) Applicant: Bose Corporation, Framingham, MA (US)

(72) Inventor: John Rule, Framingham, MA (US)

(73) Assignee: Bose Corporation, Framingham, MA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/165,468

(22) Filed: Feb. 7, 2023

(65) Prior Publication Data

US 2023/0186892 A1 Jun. 15, 2023

Related U.S. Application Data

(63) Continuation of application No. 17/225,338, filed on Apr. 8, 2021, now Pat. No. 11,600,256, which is a (Continued)

(51) Int. Cl.
*G10K 11/178* (2006.01)
*H04R 1/10* (2006.01)

(52) U.S. Cl.
CPC .. *G10K 11/17873* (2018.01); *G10K 11/17823* (2018.01); *H04R 1/1083* (2013.01); (Continued)

(58) Field of Classification Search
CPC ....... G10K 11/17873; G10K 11/17823; G10K 2210/3026; G10K 2210/3028; (Continued)

(56) References Cited

U.S. PATENT DOCUMENTS 8,073,150 B2 * 12/2011 Joho .................. G10K 11/1783 381/71.6
8,320,591 B1 * 11/2012 Wurtz .................. H04R 1/1083 381/74

(Continued)

FOREIGN PATENT DOCUMENTS

EP 2793224 A1 10/2014
GB 2487125 A * 7/2012 ............. G10K 11/16

(Continued)

OTHER PUBLICATIONS

Office Action issued in corresponding Japanese Application No. 2022-564448, dated Feb. 26, 2024.

*Primary Examiner* — Akelaw Teshale
(74) *Attorney, Agent, or Firm* — Young Basile Hanlon & MacFarlane, P.C.

(57) ABSTRACT

A first input signal captured by one or more sensors associated with an ANR headphone is received. A frequency domain representation of the first input signal is computed for a set of discrete frequencies, based on which a set of parameters is generated for a digital filter disposed in an ANR signal flow path of the ANR headphone, the set of parameters being such that a loop gain of the ANR signal flow path substantially matches a target loop gain. Generating the set of parameters comprises: adjusting a response of the digital filter at frequencies (e.g., spanning between 200 Hz-5 kHz). A response of at least 3 second order sections of the digital filter is adjusted. A second input signal in the ANR signal flow path is processed using the generated set of parameters to generate an output signal for driving the electroacoustic transducer of the ANR headphone.

24 Claims, 10 Drawing Sheets

Related U.S. Application Data continuation of application No. 17/154,114, filed on Jan. 21, 2021, now abandoned, which is a continuation of application No. 16/857,382, filed on Apr. 24, 2020, now Pat. No. 10,937,410.

(52) U.S. Cl.
CPC ................ *G10K 2210/3026* (2013.01); *G10K 2210/3028* (2013.01); *G10K 2210/3056* (2013.01)

(58) Field of Classification Search
CPC ... G10K 2210/3056; G10K 2210/1081; G10K 2210/3025; G10K 2210/3033; G10K 2210/3048; G10K 2210/504; G10K 11/17815; G10K 11/17854; G10K 11/17881; H04R 1/1083; H04R 2410/05; H04R 2430/03; H04R 2460/01
See application file for complete search history.

(56) References Cited

U.S. PATENT DOCUMENTS 8,718,290 B2 * 5/2014 Murgia .................. H04R 3/005 381/71.1
8,718,291 B2 * 5/2014 Alves ............... G10K 11/17815 381/71.8
8,798,283 B2 * 8/2014 Gauger, Jr. .......... H04R 1/1083 381/71.6
9,161,118 B2 10/2015 Howes et al.
9,792,893 B1 10/2017 Gauger, Jr. et al.
9,892,722 B1 * 2/2018 Bastyr .............. G10K 11/17854
9,949,017 B2 * 4/2018 Rule .................... H04R 1/1083
10,096,313 B1 10/2018 terMeulen et al.
10,136,222 B2 11/2018 Hayashi et al.
10,354,640 B2 7/2019 terMeulen et al.
10,595,126 B1 * 3/2020 Chen ....................... H04R 1/406
2004/0264706 A1 12/2004 Ray et al.
2005/0013447 A1 * 1/2005 Crump .................. H02M 3/156 381/74
2006/0069556 A1 * 3/2006 Nadjar ............. G10K 11/17881 704/229
2009/0010447 A1 1/2009 Naite et al.
2010/0272275 A1 * 10/2010 Carreras .......... G10K 11/17881 381/71.6
2010/0272283 A1 * 10/2010 Carreras .......... G10K 11/17823 381/71.6
2011/0222700 A1 * 9/2011 Bhandari ......... G10K 11/17875 381/71.8
2012/0170766 A1 * 7/2012 Alves ................... H04R 1/1083 381/71.11
2013/0208908 A1 * 8/2013 Theiler .................. G10K 11/16 381/71.1
2013/0315412 A1 11/2013 Annunziato et al.
2013/0329902 A1 * 12/2013 Bakalos ........... G10K 11/17833 381/71.8
2014/0126733 A1 * 5/2014 Gauger, Jr. ...... G10K 11/17837 381/71.6
2014/0126735 A1 * 5/2014 Gauger, Jr. ...... G10K 11/17837 381/71.6
2014/0126736 A1 * 5/2014 Gauger, Jr. ...... G10K 11/17837 381/71.6
2014/0126756 A1 * 5/2014 Gauger, Jr. ...... G10K 11/17857 381/71.6
2014/0363010 A1 * 12/2014 Christopher ......... H04R 1/1083 381/71.6
2016/0267899 A1 9/2016 Gauger, Jr. et al.
2017/0245045 A1 * 8/2017 Horbach .......... G10K 11/17817
2018/0206025 A1 * 7/2018 Rule .................... H04R 29/001
2018/0249266 A1 * 8/2018 Termeulen ........... H04R 1/1016
2018/0286374 A1 * 10/2018 Cattell ............. G10K 11/17881
2018/0286375 A1 * 10/2018 Cattell ................. H04R 1/1083
2019/0019491 A1 1/2019 Kumar et al.
2019/0037324 A1 * 1/2019 Darlington ............. H04R 29/00
2019/0191238 A1 * 6/2019 Horbach .............. H04R 29/001

FOREIGN PATENT DOCUMENTS

JP 2020510240 A 4/2020
WO WO-2007011337 A1 * 1/2007 ......... G10K 11/1788
WO WO-2018183714 A2 * 10/2018 ........... G10K 11/178

* cited by examiner

MANAGING CHARACTERISTICS OF ACTIVE NOISE REDUCTION

CROSS-REFERENCE TO RELATED APPLICATION(S)

This application is a continuation of U.S. application Ser. No. 17/225,338, entitled "MANAGING CHARACTERISTICS OF ACTIVE NOISE REDUCTION," filed Apr. 8, 2021, which is a continuation of U.S. application Ser. No. 17/154,114, entitled "MANAGING CHARACTERISTICS OF ACTIVE NOISE REDUCTION," filed Jan. 21, 2021, which is a continuation of U.S. application Ser. No. 16/857,382, entitled "MANAGING CHARACTERISTICS OF ACTIVE NOISE REDUCTION," filed Apr. 24, 2020, each of which is incorporated herein by reference.

TECHNICAL FIELD

This disclosure relates to managing characteristics of active noise reduction.

BACKGROUND

The earpieces of earphones or other audio or multimedia devices configured to be worn by a user, such as separate (e.g., left and right side) wireless or wired earbuds, or earpieces of headphones or other wearable devices, may include circuitry that is configured based on assumed acoustic circumstances that depends both on how well an earpiece fits when worn in, on, or around an ear as well as the acoustical properties of the wearer's ear as coupled to by the earphone. For example, for earphones that use active noise reduction (ANR), the actual acoustic circumstances associated with a particular fit and individual ear is part of a feedback loop used to provide the ANR. To ensure that the feedback loop is stable for any fit that may be experienced by any particular user at any given time, and thus avoiding feedback instability related artifacts, a trade-off may be made that sacrifices noise reduction performance to achieve that robust stability.

SUMMARY

In one aspect, in general, a method comprises: receiving a first input signal captured by one or more sensors associated with an active noise reduction (ANR) headphone; computing, by one or more processing devices, a frequency domain representation of the first input signal for a set of discrete frequencies; generating, by the one or more processing devices based on the frequency domain representation of the input signal, a set of parameters for a digital filter disposed in an ANR signal flow path of the ANR headphone, the set of parameters being such that a loop gain of the ANR signal flow path substantially matches a target loop gain, wherein generating the set of parameters comprises: adjusting a response of the digital filter at frequencies that span at least frequencies between about 200 Hz to about 5 kHz; and adjusting a response of at least 3 second order sections of the digital filter; and processing a second input signal in the ANR signal flow path using the generated set of parameters to generate an output signal for driving the electroacoustic transducer of the ANR headphone.

Aspects can include one or more of the following features.

The first input signal comprises characteristics that vary from user to user, and the second input signal comprises characteristics having reduced variation from user to user as compared to the first input signal.

The one or more sensors comprise a feedback microphone of the ANR headphone, and the ANR signal flow path comprises a feedback path disposed between the feedback microphone and the electroacoustic transducer.

For a majority of a frequency range where the feedback path has positive loop gain, a variation in a feedback insertion gain, as measured over multiple users, is less than a variation in a response of the physical acoustics of the ANR headphone, as measured by the response between the electroacoustic transducer and the feedback microphone for the multiple users.

The variation in the feedback insertion gain is at least 10% less than the variation in the response of the physical acoustics of the ANR headphone for a majority of the frequency range where the feedback path has positive loop gain.

An average feedback insertion gain, as measured over multiple users, has a high-frequency crossover that is greater than or equal to about 1.5 kHz.

Generating the set of parameters comprises: accessing a nominal set of parameters for the digital filter, determining, based on the frequency domain representation of the first input signal, a set of correction parameters, and generating the set of parameters as a combination of the nominal set of parameters and corresponding parameters in the set of correction parameters.

The nominal set of parameters are computed based on training data comprising a plurality of ear responses.

The nominal set of parameters are generated by executing an optimization process configured to generate the parameters for a corresponding ear response.

Determining the set of correction parameters comprises: computing a loop gain for the nominal set of parameters of the digital filter; generating an error vector comprising deviations of the loop gain at different frequencies from a corresponding target loop gain; and generating the set of correction parameters as the output of the optimization process based on statistics of the training data.

A total insertion gain of the ANR headphone when ANR is active is less than −30 dB in a frequency range of about 1-2 kHz.

An average active insertion gain, as measured over multiple users, has a high-frequency crossover that is greater than or equal to about 2.2 kHz.

The set of parameters is generated within 1 second of receiving the first input signal.

The method further comprises storing the generated set of parameters for identifying or authenticating a user.

The first input signal is captured responsive to delivering an audio signal through an electroacoustic transducer of the ANR headphone, the audio signal comprising a wideband signal that includes energy at a plurality of the frequencies in the set of discrete frequencies, and the frequency domain representation of the first input signal is indicative of a response of an ear to the audio signal.

The audio signal has a spectrum that comprises 10 or more tones centered at predetermined frequencies between about 45 Hz-16 kHz.

The predetermined frequencies comprise a plurality of frequencies above 1 kHz that have spacing less than or equal to ¼-octave.

The audio signal is delivered automatically in response to detecting that the ANR headphone has been positioned in, on, or around a user's ear.

The audio signal is delivered automatically in response to detecting an oscillation in the ANR signal flow path.

The one or more sensors comprise a feedforward microphone of the ANR headphone and a feedback microphone of the ANR headphone, the first input signal comprises a ratio of a feedback microphone signal and a feedforward microphone signal, and the ANR signal flow path comprises a feedforward path disposed between the feedforward microphone and the electroacoustic transducer.

The feedforward microphone signal is captured responsive to determining that the ambient noise in the vicinity of the ANR headphone is above the threshold.

The feedback microphone signal is captured responsive to delivering an audio signal through an electroacoustic transducer of the ANR headphone, the audio signal comprising a wideband signal that includes energy at a plurality of the frequencies in the set of discrete frequencies.

The feedforward microphone signal is captured responsive to determining that the ambient noise in the vicinity of the ANR headphone is above the threshold, and detecting: (i) a lack of an audio signal being played through the electroacoustic transducer; and (ii) a lack of a user speaking.

One or both of the feedforward microphone signal and the feedback microphone signal are captured repeatedly at each of a plurality of time intervals.

The method may further include measuring a quality of seal of the ANR headphone to a wearer's ear, and reducing the target loop gain when the quality of seal is less than a predetermined threshold.

In another aspect, in general, a method comprises: receiving a first input signal captured by one or more sensors associated with an active noise reduction (ANR) headphone; computing, by one or more processing devices, a frequency domain representation of the first input signal; generating, by the one or more processing devices based on the frequency domain representation of the input signal, a set of parameters for a digital filter disposed in an ANR signal flow path of the ANR headphone, the set of parameters being such that a loop gain of the ANR signal flow path substantially matches a target loop gain, wherein the generated set of parameters comprises: a first parameter associated with a first frequency of the set of discrete frequencies, the first frequency being less than a high-end gain crossover frequency at which a magnitude of a loop gain associated with the ANR signal flow path is equal to one, and a second parameter associated with a second frequency of the set of discrete frequencies, the second frequency being greater than the high-end gain crossover frequency; and processing a second input signal in the ANR signal flow path using the generated set of parameters to generate an output signal for driving the electroacoustic transducer of the ANR headphone.

The high-end gain crossover frequency in some implementations is greater than 1 kHz.

In another aspect, in general, a method comprises: in response to sensing that an earpiece of an active noise reduction (ANR) headphone has been positioned in, on, or around the ear: (i) receiving a first input signal captured by one or more sensors associated with the ANR headphone; (ii) computing, by one or more processing devices, a frequency domain representation of the first input signal for a set of discrete frequencies; (iii) generating, by the one or more processing devices based on the frequency domain representation of the input signal, a set of parameters for a digital filter disposed in an ANR signal flow path of the ANR headphone; and (iv) processing a second input signal in the ANR signal flow path using the generated set of parameters to generate an output signal for driving the electroacoustic transducer of the ANR headphone.

Aspects can include one or more of the following features.

The first input signal is captured responsive to delivering an audio signal through an electroacoustic transducer of the ANR headphone, the audio signal comprising a wideband signal that includes energy at a plurality of the frequencies in the set of discrete frequencies, and the frequency domain representation of the first input signal is indicative of a response of an ear to the audio signal.

The audio signal has a spectrum that comprises 10 or more tones centered at predetermined frequencies between about 45 Hz-16 kHz.

The predetermined frequencies comprise at least one frequency below 50 Hz and at least one frequency above 15 kHz.

The predetermined frequencies comprise a plurality of frequencies above 1 kHz that have spacing less than or equal to ¼-octave.

The audio signal is delivered automatically in response to sensing that the ANR headphone has been positioned in, on, or around a user's ear.

The one or more sensors comprise a feedback microphone of the ANR headphone, and the ANR signal flow path comprises a feedback path disposed between the feedback microphone and the electroacoustic transducer.

Generating the set of parameters comprises: accessing a nominal set of parameters for the digital filter, determining, based on the frequency domain representation of the first input signal, a set of correction parameters, and generating the set of parameters as a combination of the nominal set of parameters and corresponding parameters in the set of correction parameters.

The nominal set of parameters are computed based on training data comprising a plurality of ear responses.

The nominal set of parameters are generated by executing an optimization process configured to generate the parameters for a corresponding ear response.

Determining the set of correction parameters comprises: computing a loop gain for the nominal set of parameters of the digital filter; generating an error vector comprising deviations of the loop gain at different frequencies from a corresponding target loop gain; and generating the set of correction parameters as the output of the optimization process based on statistics of the training data.

The method further comprises storing the generated set of parameters for identifying or authenticating a user.

Generating the set of parameters comprises: adjusting a response of the digital filter at frequencies that span at least frequencies between about 200 Hz to about 5 kHz; and adjusting a response of at least 3 second order sections of the digital filter.

In another aspect, in general, a method comprises: in response to sensing an ambient noise level in a vicinity of an active noise reduction (ANR) headphone being above a predetermined threshold: (i) receiving a first input signal captured by one or more sensors associated with the ANR headphone; (ii) computing, by one or more processing devices, a frequency domain representation of the first input signal for a set of discrete frequencies; (iii) generating, by the one or more processing devices based on the frequency domain representation of the input signal, a set of parameters for a digital filter disposed in an ANR signal flow path of the ANR headphone; and (iv) processing a second input signal in the ANR signal flow path using the generated set of parameters to generate an output signal for driving the electroacoustic transducer of the ANR headphone.

Aspects can include one or more of the following features.

The one or more sensors comprise a feedforward microphone of the ANR headphone, and the ANR signal flow path comprises a feedforward path disposed between the feedforward microphone and the electroacoustic transducer.

The one or more sensors further comprise a feedback microphone of the ANR headphone, and the first input signal comprises a ratio of a feedback microphone signal and a feedforward microphone signal.

The feedback microphone signal is captured responsive to delivering an audio signal through the electroacoustic transducer of the ANR headphone, the audio signal comprising a wideband signal that includes energy at a plurality of the frequencies in the set of discrete frequencies.

One or both of the feedforward microphone signal and the feedback microphone signal are captured repeatedly at each of a plurality of time intervals.

Generating the set of parameters comprises: accessing a nominal set of parameters for the digital filter, determining, based on the frequency domain representation of the first input signal, a set of correction parameters, and generating the set of parameters as a combination of the nominal set of parameters and corresponding parameters in the set of correction parameters.

The nominal set of parameters are computed based on training data comprising a plurality of ear responses.

The nominal set of parameters are generated by executing an optimization process configured to generate the parameters for a corresponding ear response.

Determining the set of correction parameters comprises: computing a loop gain for the nominal set of parameters of the digital filter; generating an error vector comprising deviations of the loop gain at different frequencies from a corresponding target loop gain; and generating the set of correction parameters as the output of the optimization process based on statistics of the training data.

The method further comprises storing the generated set of parameters for identifying or authenticating a user.

Generating the set of parameters comprises: adjusting a response of the digital filter at frequencies that span at least frequencies between about 200 Hz to about 5 kHz; and adjusting a response of at least 3 second order sections of the digital filter.

Aspects can have one or more of the following advantages.

Systems and procedures for customizing compensators for ANR circuitry may use an ear frequency response characterizing particular acoustic circumstances for a user (e.g., when an earpiece is placed in, on, or around the user's ear). Variations due to differences among users (e.g., the shape of the user's ear canal and the acoustical properties of the wearer's ear as coupled to by the earphone) and/or fits of the earpieces can be compensated for by corresponding variations that are made to one or more filters within the ANR circuitry. In some implementations, the customization procedures may use perturbation techniques to make the computations more efficient. The perturbation techniques may include linear perturbation techniques that use substantially linear adjustments. In other implementations, the customization procedure may use other techniques such as machine learning or deep neural networks for customizing compensators for the ANR circuitry.

Due to the increase in performance of customized ANR, a variety of performance factors may be improved. For example, since the ANR does not need to satisfy certain constraints (e.g., control loop stability) for a large variety of ears/fits, the control loop can be designed to have predetermined optimized characteristics after customization. One example of a characteristic that can be determined precisely for each ear is canal resonance, as described in more detail below. Also, due to the increase in feedback loop gain and bandwidth enabled by customizing to an individual ear while maintaining sufficient stability, auditory effects such as residual occlusion of the sound of the wearer's voice may be reduced.

Due to the efficiency of the computations and the minimal computational resources that may be needed, the customization module used to perform the customization procedure may be relatively compact. In some implementations, the customization module may be built into an earpiece or other wearable audio device. The customization module may include the code and data needed to perform the customization procedure without requiring an online connection to another device (e.g., to a phone or a cloud infrastructure). A connection may be used to provide a firmware update, for example, but the connection may not be required to be active during the customization procedure.

The ability to separately customize feedback compensator and feedforward compensator performance may also be useful in some implementations. For example, the feedback compensator may be customized soon after a wearable audio device has been powered on (e.g., in response to detecting that an earpiece has been worn). The feedforward compensator may be customized at a similar time or later, depending on whether there is an adequate environmental noise level to perform the feedforward customization using signals from microphones sensing the environmental noise.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
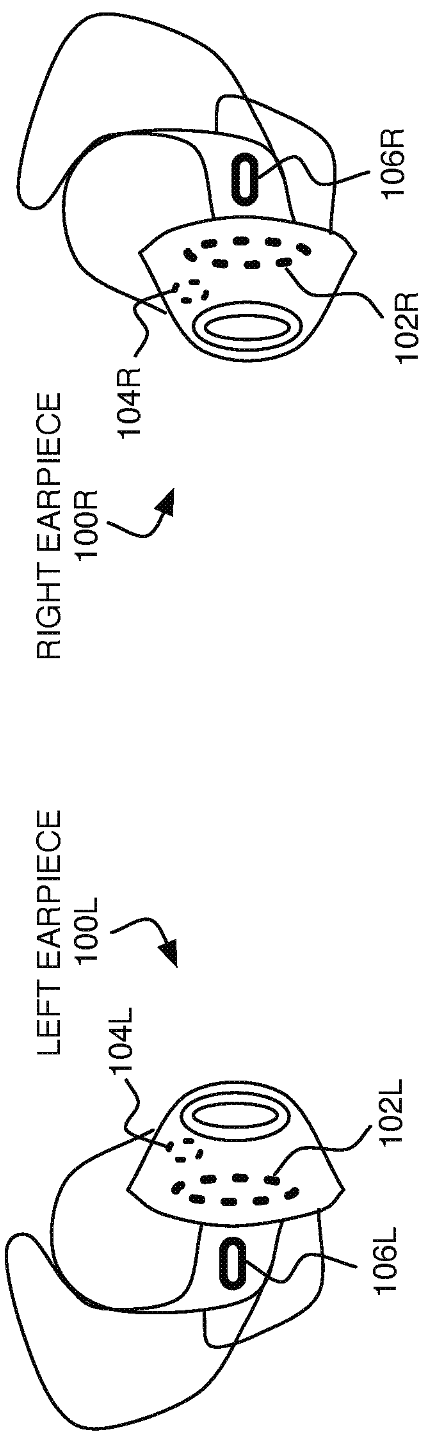
FIG. 1A is an illustration of examples of earpieces of in-ear headphones.

Some of the circuitry within earpieces used for reproducing desired signals, such as music or other acoustic signals, can be customized for a particular user's ear acoustic characteristics resulting from how well the earphone seals to the ear as well as the detailed shape of the user's ear canal and properties of the tissues of the ear and eardrum. For example, ANR performance can be customized by configuring the ANR circuitry to use particular filter parameters specific to a user. In some cases, the filter parameters can be stored in memory within or coupled to the earpiece. Some of the components within an earpiece are used in the customization procedure, as described in more detail below. Referring to FIG. 1A, examples of left/right earpieces 100L/100R that can be configured to provide customized ANR performance include acoustic drivers 102L (in earpiece 100L) and 102R (in earpiece 100R). The earpieces also include a feedback microphone 104L (in earpiece 100L) and 104R (in earpiece 100R), and a feedforward microphone 106L (in earpiece 100L) and 106R (in earpiece 100R). The acoustic drivers 102L/102R and feedback microphones 104L/104R are positioned inside the respective earpieces 100L/100R (as indicated by the dashed lines), such that the properties of these transducers, their positions, the volumes of and ports in the earbud structure combine with the geometry and properties of the wearer's ear to define an internal acoustic environment formed when the earpieces are worn. The feedforward microphones 106L/106R are positioned on an outside surface of the respective earpieces 100L/100R, such that they are exposed to an external acoustic environment when the earpieces are worn. In the examples described below, the customization procedure is described with respect to a single earpiece. In some implementations, the customization procedure is performed independently for each of the left and right earpieces. Alternatively, in other implementations, some or all of the customization procedure performed in one earpiece can be used to customize the other earpiece without requiring the full customization procedure to be repeated for the other earpiece if certain assumptions are made about the symmetry of the shape of a user's ears and/or the fit of the earpieces in, on, or around the user's ears. For example, a set of customized filter parameters for one earpiece could be used as a set of default filter parameters for the other earpiece by transmitting the filter parameters between earpieces over a wired or wireless communication connection between the earpieces.

Figures 1B, 1C, 1D:
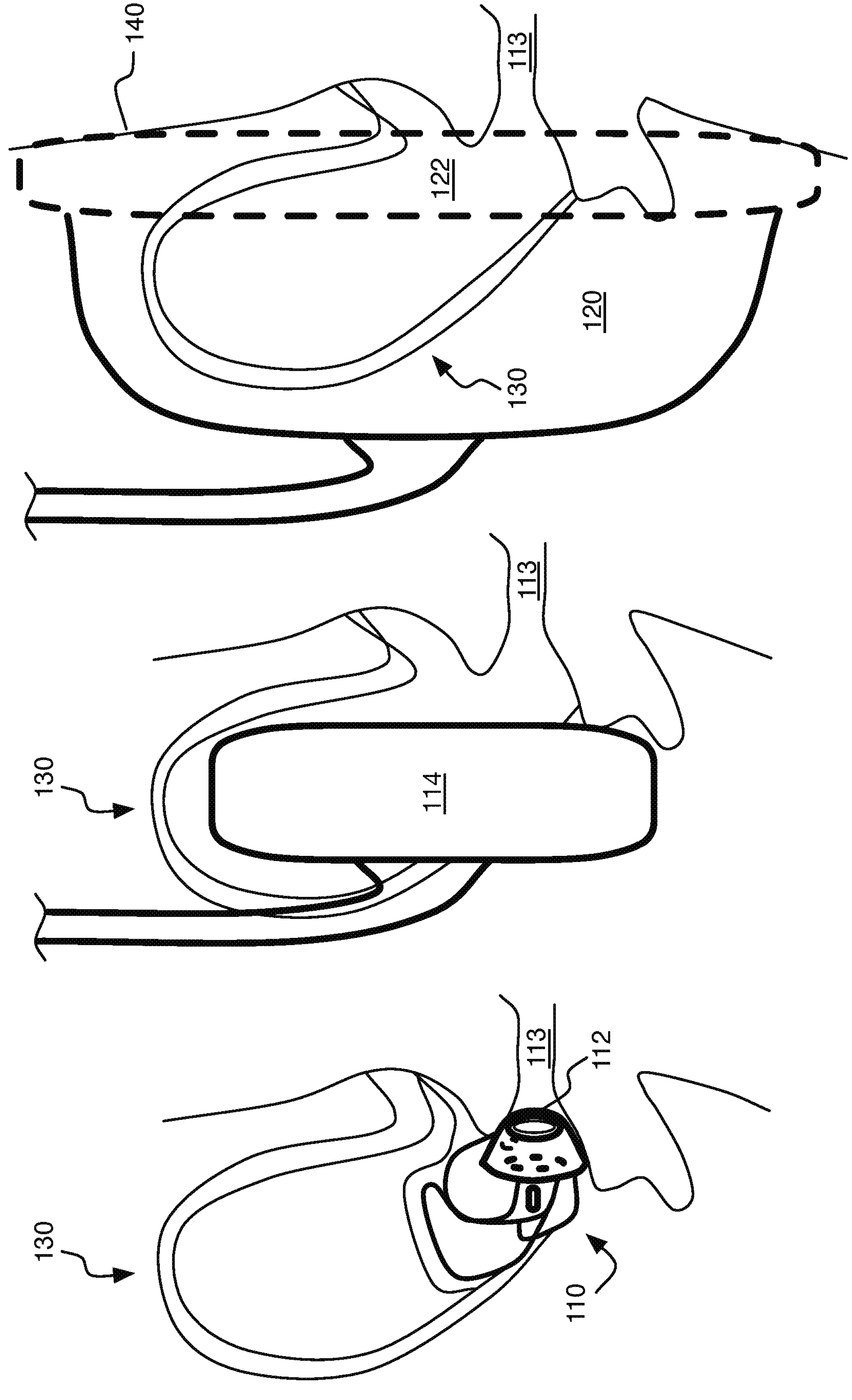
FIGS. 1B, 1C, and 1D are illustrations of earpieces as worn for in-ear, on-ear, and around ear headphones, respectively.

FIGS. 1B-1D show examples of earpieces that have been positioned in, on, or around an ear, respectively (providing an in-ear, on-ear, around-ear fit). Referring to FIG. 1B, an earpiece 110 is placed in an ear 130 with a flexible tip 112 being positioned within an outer portion of a canal 113 of the ear 130, forming a substantially closed acoustic environment within the canal 113. Referring to FIG. 1C, an earpiece 114 is placed on the ear 130, where the earpiece 114 is formed with a cushioned portion being held against a pinna of the ear 130 to form a substantially sealed acoustic environment leading to the canal 113. Referring to FIG. 1D, an earpiece 120 is placed around the ear 130 with a cushion 122 being positioned against portions of the head 140 surrounding the ear 130 to form a substantially sealed acoustic environment leading to the canal 113.

Figure 2:
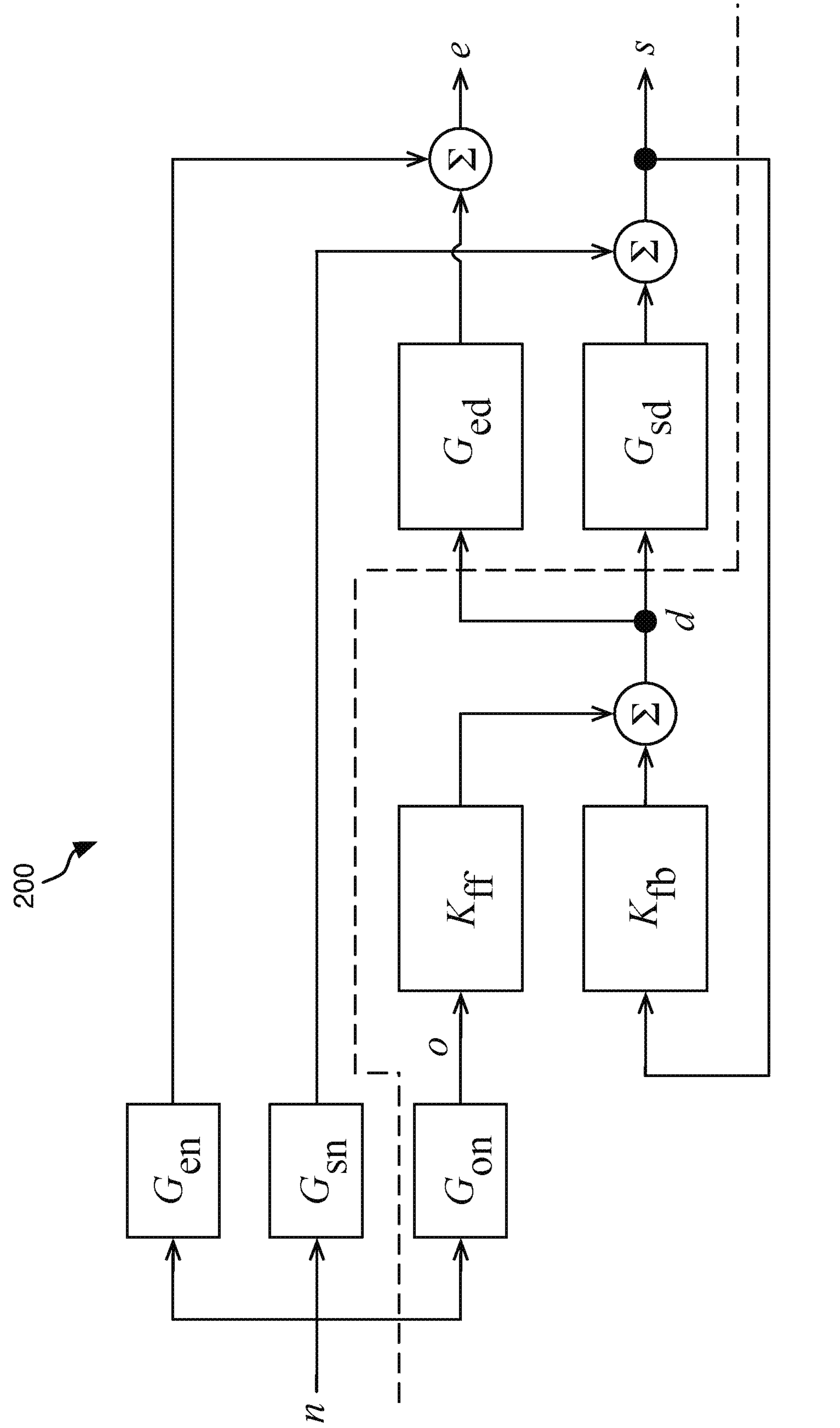
FIG. 2 is a block diagram of portions of a system that includes ANR circuitry.

FIG. 2 shows a block diagram representation 200 of a system in the context of an earpiece that has been positioned in, on, or around an ear. The system includes the system being controlled (also called the plant) and a portion of the system providing customized control, which in this example includes the ANR circuitry including the feedback microphones and feedforward microphones (also called plant sensors). The system is also in an external acoustic environment that provides a noise input to the system. In this example, the plant corresponds to the sound propagating into the ear, which is represented by an "ear" variable e. The system is able to obtain an approximation to this variable using a feedback microphone placed in the contained/internal acoustic environment formed by the earpiece from which sound propagates further into the ear canal. This system approximation of the ear variable, which will be controlled using customized feedback, is represented by a "system" variable s. The system is able to obtain a sample of the noise in the external acoustic environment, represented by variable n, just outside of the earpiece using a feedforward microphone placed somewhere on the outside of the earpiece. This sample of the external environment outside of the earpiece is represented by an "outside" variable o. These variables may have quantitative values that indicate a physical quantity associated with acoustic waves such as pressure, and may be represented as time-dependent signals having different values over time, or as frequency-dependent signals having different values over frequency. Finally, the system includes two compensating filters, $K_{fb}$ and $K_{ff}$ that take the signals from the feedback and feedforward microphone respectively to determine the electrical signal input to the acoustic driver within the earpiece, represented by variable d. The following set of equations represents a set of relationships between various variables in this system.

$$d=K_{fb}s+K_{ff}o$$

$$s=G_{sd}d+G_{sn}n$$

$$e=G_{ed}d+G_{en}n$$

$$o=G_{on}n$$

The values represented as G with various subscripts correspond to transfer functions to either of the microphones (o or s) or to the ear (e), as the first subscript, from either of the inputs (n or d), as the second subscript. So, the plant transfer function corresponds to the value $G_{sd}$. In some representations, the transfer functions may be represented as frequency-dependent complex-valued expressions using any of a variety of formulations for representing time-dependent signals (e.g., continuous-time signals or discrete-time signals) using any of a variety of transforms (e.g., a Fourier Transform, Laplace Transform, Discrete Fourier Transform, or Z-Transform). The values represented as K correspond to compensators, which may be implemented as digital filters, including a feedback compensator $K_{fb}$ and a feedforward compensator $K_{ff}$. When implemented digitally in a low-latency fashion, which is important for feedback systems, such filters are commonly designed as a combination of second-order recursive filters which are commonly referred to as "biquads" since, expressed in the Z domain, they are the ratio of two quadratic functions in $z^{-1}$, the unit delay operator. Each biquad is specified by five parameters, determining two poles and two zeros plus gain which characterize the biquad's frequency response. In some implementations, additional compensators can be included at various locations in the system, such as an audio equalizer compensator. Any of these compensators can be customized as part of the customization techniques described herein.

The driver d and noise n in these equations can be eliminated to produce a pair of relationships expressing the ratios of acoustic signals measured at the feedback microphone, or provided to the ear, respectively, relative to the noise:

$$\frac{s}{n} = \frac{K_{ff}G_{sd}G_{on} + G_{sn}}{1 - K_{fb}G_{sd}}$$

$$\frac{e}{n} = G_e\left[1 + G_{ed}\frac{\left(\frac{G_{sn}}{G_{en}}\right)K_{fb} + \left(\frac{G_{on}}{G_{en}}\right)K_{ff}}{1 - K_{fb}G_{sd}}\right]$$

As a reference, the open-ear response to the noise can be defined as:

$$\left.\frac{e}{n}\right|_{open} \equiv G_{en}|_o$$

The total performance of the system can be defined as an Insertion Gain (IG), which in this example is expressed as the ratio of sound at the ear relative to the noise, with the earpiece in, on, or around the ear and with the ANR circuitry active (referred to as the "active system"), divided by the open-ear response, which is $$\frac{e}{n}$$

divided by $$\left.\frac{e}{n}\right|_{open}:$$

$$IG = PIG\left[1 + G_{ed}\frac{\left(\frac{G_{sn}}{G_{en}}\right)K_{fb} + \left(\frac{G_{on}}{G_{en}}\right)K_{ff}}{1 - K_{fb}G_{sd}}\right]$$

where the passive insertion gain, PIG, is defined as the purely passive response to the active system:

$$PIG \equiv \frac{G_e}{G_{en}|_o}$$

These example expressions have been written as transfer functions with respect to noise, since noise can be considered as the input to the system. In general, there may not be a measure of the "noise" in the diffuse field sense, but there may be a measure of noise at a point (e.g., as measured with an omni reference microphone). For this reason, the expressions of IG and PIG may be evaluated as energy ratios (without phase) taken at a microphone located at the point in the system corresponding to variable e, before and after the earpiece is placed in, on, or around the ear, with the system in either active or passive mode, respectively. For example, a small microphone may be suspended mid-way down the length of an ear canal to measure e.

Extending this further, the various noise terms can be expressed as normalized cross spectra between the available microphones, as follows:

$$N_{so} \equiv \frac{G_{sn}}{G_{on}},\ N_{eo} \equiv \frac{G_{en}}{G_{on}},\ N_{es} \equiv \frac{G_{en}}{G_{sn}}$$

Using these definitions and substituting into the equation for IG, another more compact definition of insertion gain can be expressed as:

$$IG = PIG\left[1 + \left(\frac{G_{ed}}{N_{eo}}\right)\frac{N_{so}K_{fb} + K_{ff}}{1 - K_{fb}G_{sd}}\right]$$

We now have an equation that relates total insertion gain of the active system to the measured acoustics of the system and the two compensators, $K_{fb}$ and $K_{ff}$. This equation can be used to compute an optimal feedback compensator $K_{fb}$ for a given set of conditions defined by a set of $G_{sd}$ conditions defined by one or more ears.

It is also possible to solve for an optimal feedforward compensator $K_{ff}$ in terms of these other parameters and a target insertion gain, given the solution for Kfb. In some implementations, the insertion gain IG is set to 0 for full ANR (e.g., for maximum noise cancellation), and the insertion gain IG is set to 1 for minimal ANR (e.g., for maximum awareness of the outside acoustic environment, including bypassing the PIG and the FBIG, the insertion gain change from the feedback portion of the system alone). The target IG may also be set to some desired response, varying with frequency. Different compensation filters can be configured to achieve the "noise cancellation" (nc) condition, or the "aware" (aw) condition, or an intermediate condition within a range of insertion gain targets between 0 and 1. Multiple $K_{ff}$ filters can be stored in the earphone or computed on-the-fly, and controls used to switch between them or to combine several filters operating in parallel, to achieve desirable effects in the resulting IG. Examples are further described in U.S. Pat. Nos. 10,096,313 and 10,354,640, which are incorporated by reference herein in their entirety.

A variety of optimization techniques can be used to configure a set of filter parameters for each of the digital filters realizing the feedforward and feedback compensators given these definitions, other constraints, and measured acoustic responses to both driver and noise inputs. For example, measurements can be made for a large sample of users with different ear characteristics to determine a single set of filter parameters for each of the compensators that could be used for all users and all fits of the earpieces in, on, or around the users' ears. In some implementations of such a fixed-filter configuration, the filters could be designed around the average measured $G_{sd}$ and with a goal of delivering some average level of performance taken across all users, with some users getting better than average noise reduction and some users getting worse than average noise reduction. Preferably, in some implementations of a fixed-filter configuration, additional conditions such as stable feedback behavior may be imposed for all users, which may result in the filters accommodating worst case $G_{sd}$ responses resulting in less performance than could be achieved when designing just for the average.

Figure 3A:
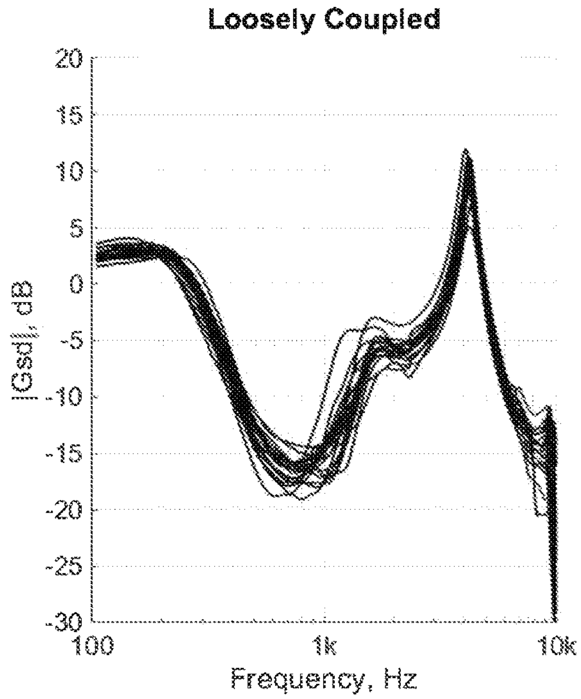
FIGS. 3A and 3B are plots of magnitudes of example frequency responses.
Figure 3B:
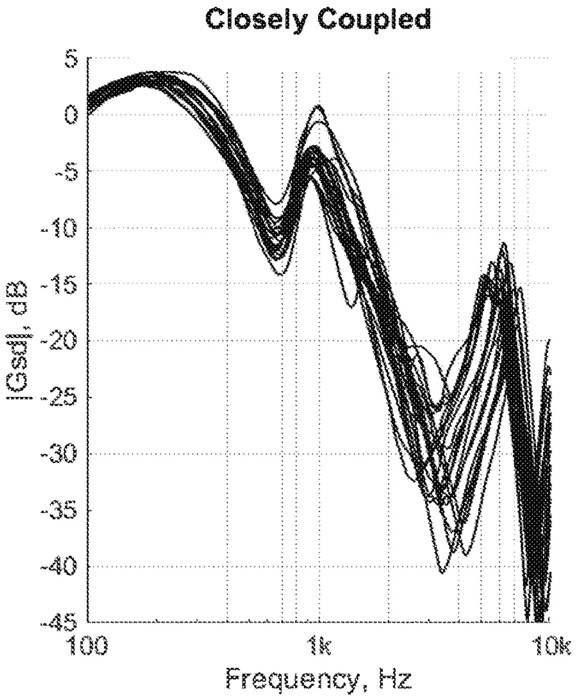
Figure 3C:
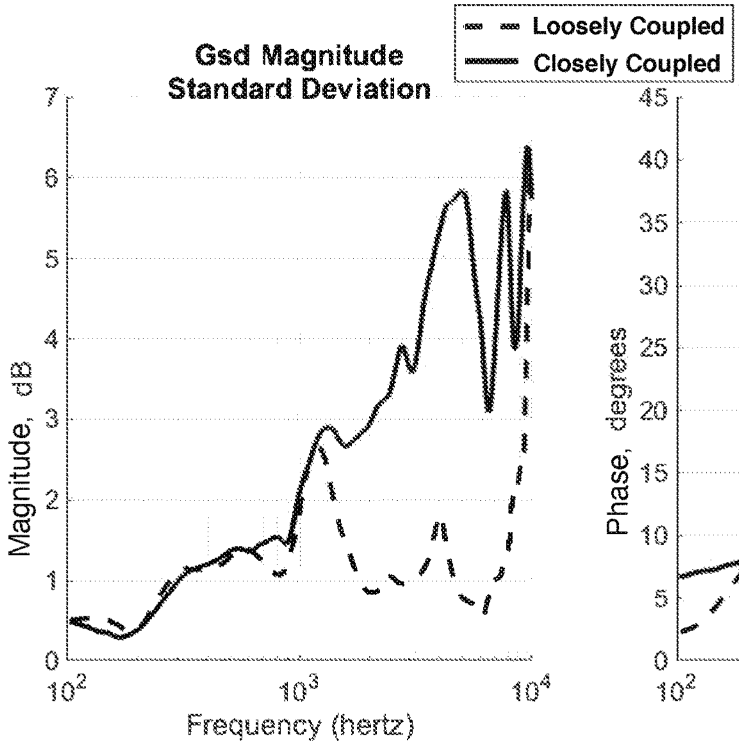
FIGS. 3C and 3D are plots of standard deviation of magnitude and phase, respectively, of example frequency responses.
Figure 3D:
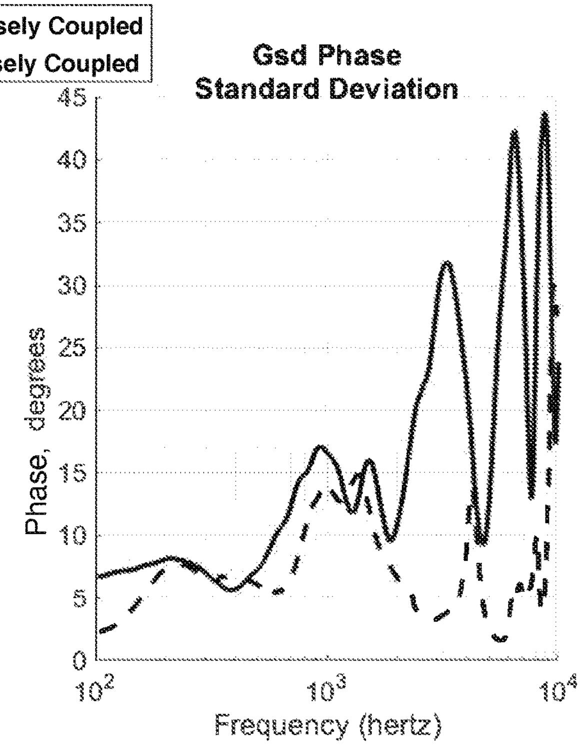

In addition, an earphone may be designed in such a way as to reduce $G_{sd}$ variation at high frequencies, as determined by the interaction of the earphone's acoustical design with the characteristics of the wearer's ear. This reduced variation simplifies the design of a fixed $K_{fb}$ suitable for any user's ear, but it also results in less cancellation bandwidth. U.S. Pat. No. 9,792,893, incorporated herein by reference in its entirety, describes an earphone design that achieves the potential for high cancellation bandwidth acoustically (as measured in the ear canal, system variable e in the above mathematical model) due to its close coupling with the ear canal. To enable the full performance possible with such an earphone, customized compensator filters matched to the individual user's ear may be used. To illustrate, FIG. 3A shows the $G_{sd}$ magnitude measured in a set of ears for a more loosely coupled system with a nozzle designed to reduce variation (such an example system is described in U.S. Pat. No. 9,792,893). FIG. 3B shows the $G_{sd}$ magnitude measured in a comparable set of ears for a more closely coupled system, examples of which are described in more detail in U.S. Pat. No. 9,792,893, which results in high potential cancellation. In both cases, the $G_{sd}$ responses have been gain normalized to approximately adjust for variation at lower frequencies caused by ear-to-ear variation in seal and ear canal volume. One can see the greater variation at high frequencies in the closely coupled earphone (FIG. 3B). The lower figures show this variation in terms of the standard deviation of the magnitude (FIG. 3C) and the phase (FIG. 3D); other measures of variation may also be used. Note how, beginning at approximately 1.5 kHz, the two variation curves diverge substantially. The loosely coupled earphone, which in this example has a feedback potential cancellation bandwidth of approximately 1 kHz, can be successfully compensated with a fixed filter for any ear. The closely coupled earphone, which in this example has a feedback potential cancellation bandwidth greater than 2.5 kHz, cannot be compensated with a fixed filter with a feedback loop bandwidth approaching the potential cancellation bandwidth because of the high amount of $G_{sd}$ variation at and near the feedback loop gain crossover frequency. To realize actual feedback noise cancellation performance approaching the acoustic potential cancellation of this earphone, feedback compensation filters may be used that are individually matched to the ear. The present disclosure describes practical techniques to achieve such filter customization. However, it should be noted that the described techniques may also be applied to loosely coupled systems as well.

The system can be designed to determine custom-filter configurations for each user's ear and/or each donning by each user (e.g., each time an earpiece is placed in, on, or around a user's ear), enabling improved performance for each user. With the computational cost that may be needed to ensure that all of the performance and stability constraints are met, it may be difficult to perform a full optimization procedure from scratch for each donning to achieve such a custom-filter configuration for a practical, power-constrained wearable system. But, using techniques described in this document, computations can be performed in an online procedure for each user and each donning event using computing resources that can be built into wearable devices that include earpieces.

In the online procedure, a set of custom filter parameters can be generated based on a nominal data set that has been determined based on statistics of training data. For example, a nominal data set comprising a nominal set of filter parameters may be computed based on training data comprising a plurality of ear frequency responses ($G_{sd}$, $G_{ed}$, $N_{so}$ and $N_{eo}$ for each subject ear) and corresponding filter frequency responses ($K_{fb}$ and $K_{ff}$). Any of a variety of techniques can be used to compute the nominal set of filter parameters. An example of an analysis that may be performed to generate the nominal data set is now described. An offline procedure can be used to generate a custom compensator for an individual ear and fit to that ear using any of a number of optimization methods. The offline procedure may not need to be as quick as the online procedure. The offline procedure may take a response corresponding to a single donning as input and produce a single set of filter parameters for compensators meant for use with that donning only and which meet certain predetermined design constraints related to the acoustic characteristics of the earphone (potential cancellation, volume displacement, etc.) as well as system performance targets for IG or FBIG and stability considerations. In this way, a large number of donning events can be taken as input and used to generate a large number of matching compensators as training data, which may reveal some underlying structure that can be exploited. The optimization method used is not important, just that the system designer has chosen that method as giving the best choice of compensator filter(s) for a given donning (individual-ear acoustic condition).

The training data may include real-ear response data in the form of measurement transfer functions and normalized cross-spectra. For example, the real-ear response data may be defined as the ratio of input and output Fourier Transforms (e.g., a Fast Fourier Transform (FFT)) of time-domain signals that have been recorded by microphones. The results of the real-ear response data may be stored in the form of a vector of complex numbers. In this representation, there is no underlying physical model relating properties of the plant—in this example, the combination of a user's ear characteristics (as influenced by size and shape of the user's ear canal) and the earpiece—with the particular contours in the frequency response. But, there may be a number of characteristics of the data that can be accounted for and which influence these responses, such as driver design, microphone response, port design, ear canal geometry, and fit quality. Any of these characteristics may impact the driver to system microphone response Gad, and these characteristics may produce identifiable features in the frequency response.

Various plant parameters can be identified within the real-ear response data such as poles and zeros fit to the response data and these parameters may cluster when plotted over frequency. Similarly, the poles and zeros corresponding to compensator biquads for each individual donning will vary and cluster, and particularly at higher frequencies, the plant parameters and compensator parameters may exhibit a roughly inverse relationship. For example, plant zeros and compensator poles may be aligned, and plant poles and compensator zeros may be aligned. This can be understood from a control design perspective, since a high-level goal of feedback control design is to invert the plant dynamics in the process of shaping to a desirable loop response. Thus, the training data provides an opportunity to prescribe compensator parameters based on measured plant response.

Some of the implementations described herein use a perturbation analysis to achieve this matching of feedback compensator response to plant dynamics. Perturbation analysis is a linearization technique that takes a nonlinear set of governing equations and assumes that solutions near a known nonlinear solution can be found by taking small linear steps, or perturbations, from the known solution. In this example, there is a plant model and a matched compensator—both of which may be modeled as products of non-linear rational functions—and it is the product of these two functions that defines a loop gain for the feedback system.

Without intending to be bound by theory, the following example of a perturbation analysis starts by assuming that the functions of interest can be written as a nominal solution plus a small additive deviation (indicated by Δ, for a term that is near 0). In this case, we make the following assumptions for $G_{sd}$ and $K_{fb}$:

$$G_{sd}=\overline{G}_{sd}+\Delta G_{sd}$$

$$K_{fb}=\overline{K}_{fb}+\Delta K_{fb}$$

where overbar terms (e.g., $\overline{G}_{sd}$ and $\overline{K}_{fb}$) signify the nominal solution, and delta terms (e.g., $\Delta G_{sd}$ and $\Delta K_{fb}$) signify a small deviation from that nominal solution. From this, the loop gain (complex loop response) LG can be defined as:

$$LG=\overline{LG}+\Delta LG=G_{sd}K_{fb}=(\overline{G}_{sd}+\Delta G_{sd})(\overline{K}_{fb}+\Delta K_{fb})$$
$$=\overline{G}_{sd}\overline{K}_{fb}+\Delta G_{sd}\overline{K}_{fb}+\overline{G}_{sd}\Delta K_{fb}+\Delta G_{sd}\Delta K_{fb}$$

The term $\overline{G}_{sd}\overline{K}_{fb}$ corresponds to nominal loop gain, where $\overline{LG}\equiv\overline{G}_{sd}\overline{K}_{fb}$. The term $\Delta G_{sd}\overline{K}_{fb}$ corresponds to a contribution to the deviation in loop gain due to variability among different ears/donnings. The term $\overline{G}_{sd}\Delta K_{fb}$ corresponds to a contribution to the deviation in loop gain due to customization of the feedback compensator. The term $\Delta G_{sd}\Delta K_{fb}$ can be neglected since it is the product of two small terms. With terms expanded in this manner, it suggests that the loop gain for any particular fit deviates from the nominal due to small variations in individual driver to microphone response, $\Delta G_{sd}$, but that it is also possible to alter the loop gain with small changes to the compensator, $\Delta K_{fb}$. Thus, in some implementations, the following condition can be imposed:

$$\Delta LG=0$$

This leaves the following relationship between nominal and perturbed parameters:

$$\Delta G_{sd}\overline{K}_{fb}+G_{sd}\Delta K_{fb}=0$$

The following are examples of system parameterization that is consistent with the assumption of small linear changes, including examples that satisfy the equation above, for customization of the feedback compensator.

The above example, expressed in terms of linear perturbations, is based on the product of two nominal functions with small linear deviations. An alternative representation of a perturbation analysis can be expressed in terms of perturbations using multiplicative deviations. For example, the measured driver to microphone response, $G_{sd}$, may be expressed as a nominal response cascaded with a fit-specific delta factor, using a multiplicative deviation (indicated by δ, for a term that is near 1):

$$G_{sd}|_{meas}=\overline{G}_{sd}\delta G_{sd}$$

If the loop gain is measured using the nominal compensator, then the measured loop gain is:

$$LG|_{meas}=G_{sd}|_{meas}\overline{K}_{fb}=\overline{G}_{sd}\overline{K}_{fb}\delta G_{sd}$$

and the deviation between measured and nominal loop gain may be expressed by dividing $LG|_{meas}$ by the nominal loop gain as follows:

$$\delta LG|_{meas}=\frac{LG|_{meas}}{\overline{LG}}=\frac{\overline{G}_{sd}\overline{K}_{fb}}{\overline{G}_{sd}\overline{K}_{fb}}=\delta G_{sd}$$

At this point, the measured loop gain only deviates from target because $G_{sd}$ for this particular earphone donning deviates from the nominal $G_{sd}$ by substantially the same amount. A goal may then be to drive the loop gain back to the nominal target by adjusting the compensator such that the final loop gain delta is unity. This can be achieved by adjusting the compensator with a multiplicative transfer function adjustment, $\delta K_{fb}$, as follows:

$$\delta LG|_{final}=\delta LG|_{meas}\delta K_{fb}=\delta G_{sd}\delta K_{fb}\equiv 1$$

which leads to:

$$\delta K_{fb}=\frac{1}{\delta G_{sd}}$$

Or, when operating on quantities in log space $\tilde{X}=\log_{10}(X)$, and a multiplicative deviation can be expressed as an additive deviation according to $\log_{10}(\delta X)=\Delta\tilde{X}$, this relationship can be expressed as:

$$\Delta\tilde{K}_{fb}=-\Delta\tilde{G}_{sd}$$

So, the customized compensator deviation (or correction) is able to substantially invert (or subtract in log space) the deviation introduced by real-ear response variability. The nominal compensator may be implemented, for example, as a relatively low order filter (e.g., using approximately 4-7 biquad stages). The customized compensator $K_{fb}$ can be adjusted from the nominal compensator $\overline{K}_{fb}$ such that the change in its transfer function inverts the change in the plant response $G_{sd}$. The following examples illustrate linear perturbation techniques that may be used to compute these adjustments.

This example parameterizes the compensator by defining parameters characterizing poles and zeros of N biquad stages that are cascaded together (e.g., multiplied in series) to form the full compensator filter. Each of the N biquad filters (labeled BQ1 to BQN) is characterized by two poles (e.g., a complex pair of poles) associated with a pole frequency, and two zeros associated with a zero frequency $Z_f$. The filter can be characterized by the ratio between these frequencies $$\frac{P_f}{Z_f},$$

and by a center frequency $f_c$. There are also Q-factors that characterize the filter shape: a pole Q-factor $P_Q$ and a zero Q-factor $Z_Q$. So, each biquad filter can be characterized by a different set of parameters BQi (for i=1 to N), where:

$$BQi=\left\{f_c,\ \frac{P_f}{Z_f},\ Z_Q,\ P_Q\right\}$$

and the following expression represents a parameter vector that is formed from a series of sets of parameters for each of the N biquad filters:

$$\Gamma_j=[BQ1,\ \ldots,BQN]^T$$

In other implementations, the parameters that characterize a given biquad filter may be different. For example, instead of the four parameters above, the parameters chosen may be the pole and zero frequencies themselves along with their associated Q-factors, or they may be the quadratic coefficients directly used in digitally implementing biquads, as well as other possibilities. Other filter representations besides biquads, each with its own frequency response specifying parameters, may be used as well.

Given a nominal parameter vector, $\overline{\Gamma}_j$, which produces a nominal compensator, $\overline{K}_{fb}$ we can numerically perturb each parameter by an amount $\Delta\Gamma_j$ and compute the resulting change in compensator response:

$$\Gamma_j = \bar{\Gamma}_j + \Delta\Gamma_j = \left[\bar{f}_c + \Delta f_c, \left(\frac{\bar{P}_f}{Z_f}\right) + \Delta\left(\frac{P_f}{Z_f}\right), \ldots\right]^T$$

The custom compensator and the nominal compensator can be computed a function of the perturbed parameter vector and the nominal compensator, respectively:

$$K_{fb} = \mathcal{F}(\Gamma_j)$$

$$\bar{K}_{fb} = \mathcal{F}(\bar{\Gamma}_j)$$

Figure 4A:
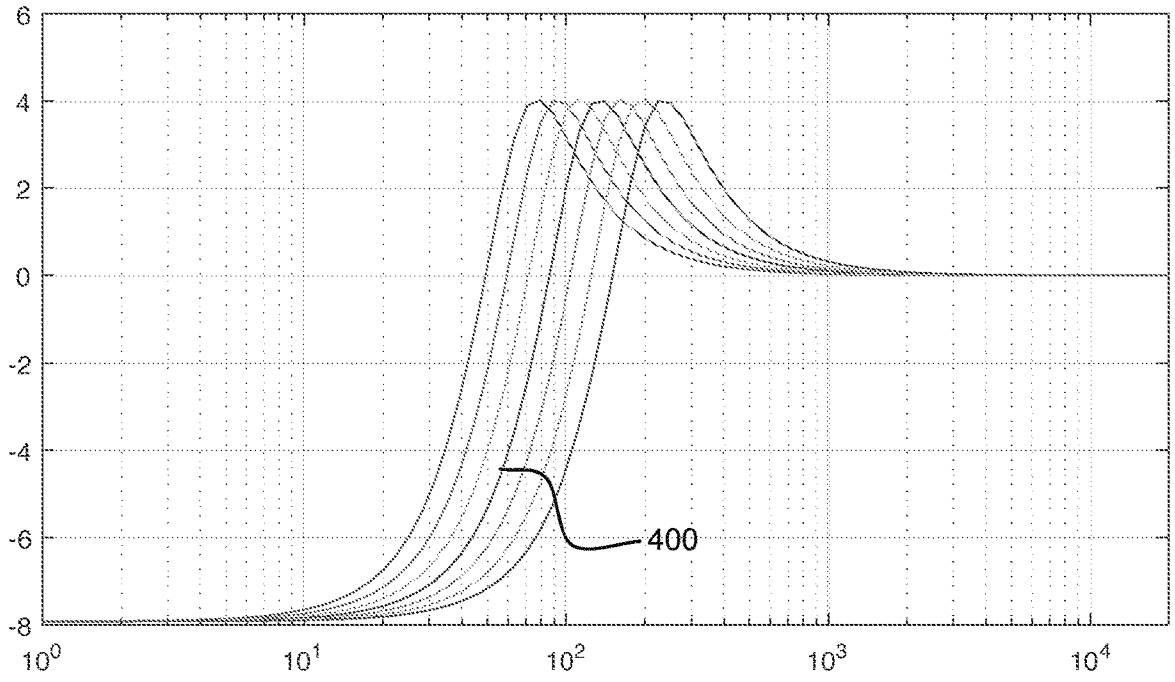
FIGS. 4A and 4B are plots of filter magnitude and phase characteristics, respectively.
Figure 4B:
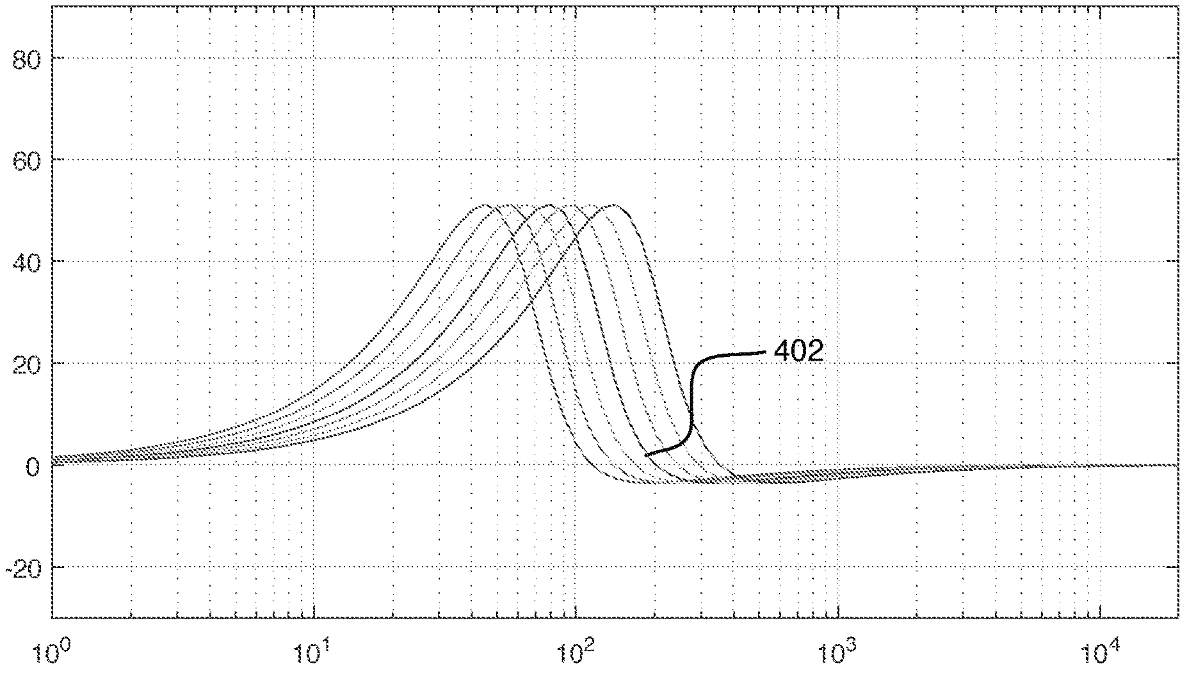
Figure 4C:
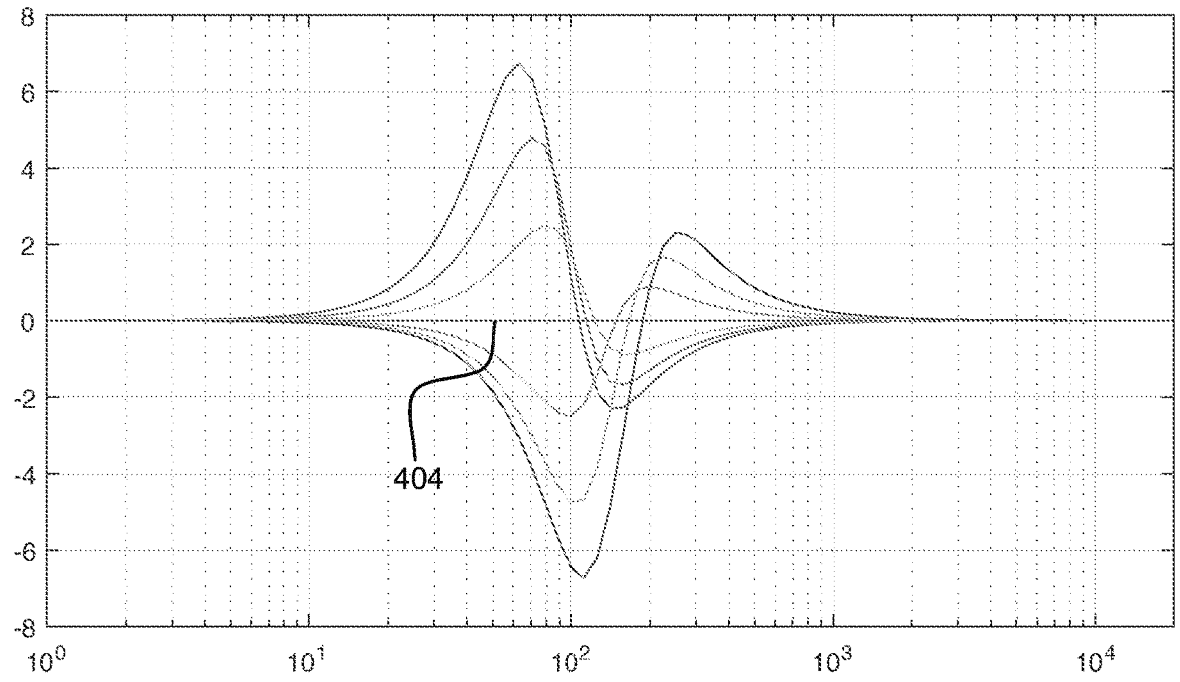
FIGS. 4C and 4D are plots of relative filter magnitude and phase characteristics, respectively.
Figure 4D:
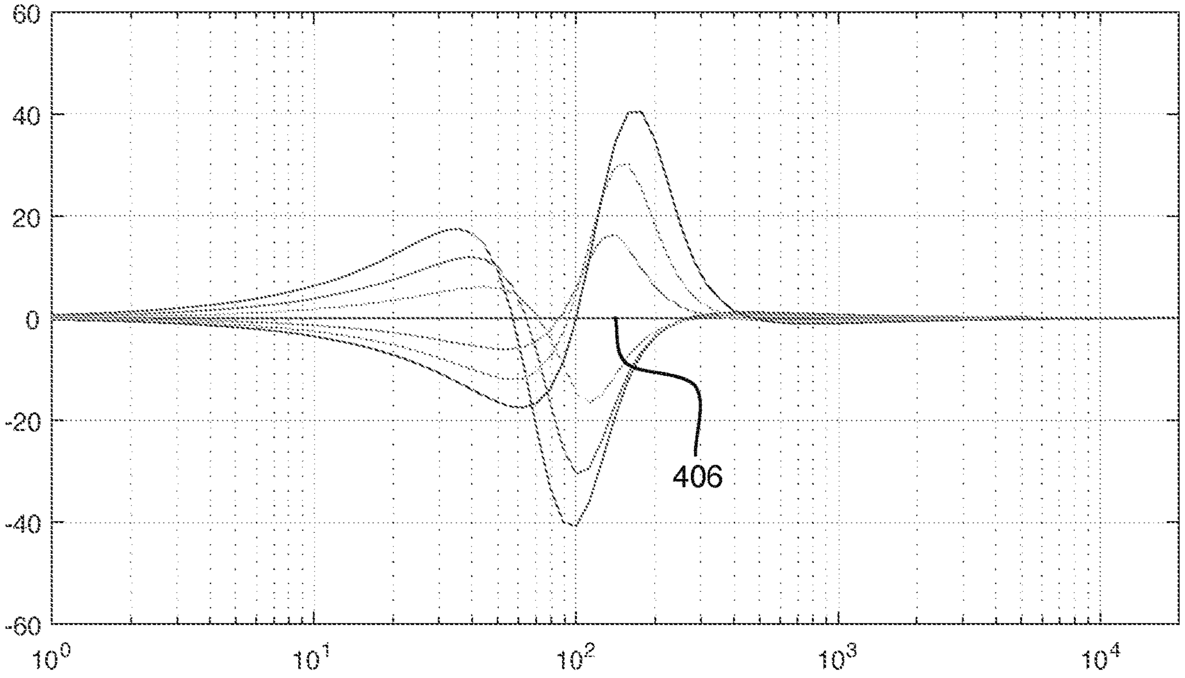

We now have two compensators, each of which represents a realizable filter with only slight differences, defined by $\Delta\Gamma_j$, in the underlying parameterization. These slight differences are important, as they are needed to correct for ear-to-ear changes in Gad. FIGS. 4A-4D illustrate changes that can be made to a compensator with a single biquad filter stage by varying a single parameter, which in this example is the center frequency $f_c$. Referring to FIG. 4A, a shape 400 of an absolute magnitude (in log space) of a nominal compensator is shown, with changes to the filter shape shown on either side as the center frequency is reduced or increased. Referring to FIG. 4B, a shape 402 of a phase (in log space) of the nominal compensator is shown, with changes to the filter shape shown on either side as the center frequency is reduced or increased. FIGS. 4C and 4D show the relative magnitude and phase characteristics that are the result of dividing each of these curves for the magnitude and phase by the nominal magnitude and phase, respectively. So, the flat relative magnitude response shape 404 corresponds to the magnitude response shape 400 divided by itself; and the flat relative phase response 406 corresponds to the phase response shape 402 divided by itself. Relative magnitude and phase responses for changing center frequency relative to the nominal compensator are shown along with these flat responses. The difference between any of the perturbed filters and the nominal filter, which is a nonlinear function of the particular parameter change, can be computed as:

$$\delta K_{fb} = \frac{K_{fb}}{\bar{K}_{fb}}$$

The preceding equations provide a construct for determining an incremental change in the compensator used to compensate for a deviation in an individual ear response from nominal. However, to implement the construct we can relate a desired change in frequency response, commonly described as a ratio of Fourier Transforms in terms such as a magnitude and phase, into a correction to the filter parameters $\Delta\Gamma_j$ which specify, by some parameterization, the poles and zeros or coefficients of the biquad filters. The exact relationship of filter parameters $\Gamma_j$ to filter response $K_{fb}$, is nonlinear. However, instead of an exact nonlinear computation, the ANR circuitry of an earpiece can be configured to perform a perturbation computation that is linearized about small parameter changes to approximate this nonlinear relationship. For example, one may use a vector of partial derivatives of magnitudes and phases to compute the change in the compensator response at a particular frequency, $f_i$, due to a particular parameter change, $\Delta\Gamma_j$ as:

$$\begin{bmatrix} \dfrac{\partial|K_{fb}|}{\partial\Gamma_j} \\ \dfrac{\partial\angle K_{fb}}{\partial\Gamma_j} \end{bmatrix}_{f_i} \Leftarrow \left.\frac{\dfrac{K_{fb}(\bar{\Gamma}_j + \Delta\Gamma_j)}{\bar{K}_{fb}} - \dfrac{K_{fb}(\bar{\Gamma}_j - \Delta\Gamma_j)}{\bar{K}_{fb}}}{2\Delta\Gamma_j}\right|_{f_i}$$

The customization process can include evaluating the complex response on the right side of this relation to describe how changes to filter parameters change the magnitude and phase response of a given nominal filter response. While these partial derivatives could be evaluated analytically, without sacrificing much accuracy, various approximations of partial derivative calculations can be implemented. In this example, the partial derivative of compensator response with respect to a single compensator parameter is estimated via a first order finite difference.

There may be a number of parameters all changing by a small amount. Using this linearization the total change in magnitude at a given frequency can be represented as the sum of the contributions of all the individual changes in the parameter, where the magnitude of the compensator response is assumed to be expressed in log space, yielding the relationship between additive deviations:

$$\Delta|K_{fb}(f_i)| = \sum_{j=1}^{N} \left.\frac{\partial|K_{fb}|}{\partial\Gamma_j}\right|_{f_i} \Delta\Gamma_j$$

There are similar relationships for phase. So, we can evaluate the change in magnitude and phase at a vector of M frequency points, $\vec{f}$, due to a vector of N small parameter changes as:

$$\Delta\begin{bmatrix} |K_{fb}(f_1)| \\ \vdots \\ |K_{fb}(f_M)| \\ \angle K_{fb}(f_1) \\ \vdots \\ \angle K_{fb}(f_M) \end{bmatrix} = \begin{bmatrix} \left.\frac{\partial|K_{fb}|}{\partial\Gamma_1}\right|_{f_1} & \cdots & \left.\frac{\partial|K_{fb}|}{\partial\Gamma_N}\right|_{f_1} \\ \vdots & \ddots & \vdots \\ \left.\frac{\partial|K_{fb}|}{\partial\Gamma_1}\right|_{f_M} & \cdots & \left.\frac{\partial|K_{fb}|}{\partial\Gamma_N}\right|_{f_M} \\ \hline \left.\frac{\partial\angle K_{fb}}{\partial\Gamma_1}\right|_{f_1} & \cdots & \left.\frac{\partial\angle K_{fb}}{\partial\Gamma_N}\right|_{f_1} \\ \vdots & \ddots & \vdots \\ \left.\frac{\partial\angle K_{fb}}{\partial\Gamma_1}\right|_{f_M} & \cdots & \left.\frac{\partial\angle K_{fb}}{\partial\Gamma_N}\right|_{f_M} \end{bmatrix} \begin{bmatrix} \Delta\Gamma_1 \\ \vdots \\ \Delta\Gamma_N \end{bmatrix}$$

This is a formulation of a linear system for computing magnitudes (in the top rows) and phase (in the bottom rows), using a matrix (called the "influence matrix") where each row represents the influence of all the small changes in compensator parameters to the response at a single frequency, and each column represents the influence of a single parameter change at all of a chosen set of frequencies. This equation can be expressed more compactly as:

$$\Delta K_{fb}(f_i) = \left.\frac{\partial K_{fb}}{\partial\Gamma}\right|_{ij} \Delta\Gamma_j$$

The customization module can be programmed to apply a solver that computes the small adjustments to the compensator that cancel out the changes for a particular fit, which can be estimated using a customization audio signal that is provided to an earpiece driver and measured by an earpiece microphone for computing an ear frequency response, as described in more detail below. The equations above for $\delta K_{fb}$ (and $\Delta\tilde{K}_{fb}$ for log space) indicate that the ideal compensator adjustment can be obtained as the inverse of the plant response variation. The equation above can be used to derive the relationship between compensator parameters and compensator response at a discrete set of frequencies, as follows (using the log space formulation):

$$\left.\frac{\partial K_{fb}}{\partial \Gamma}\right|_{ij} \Delta\Gamma_j = -\Delta G_{sd}(f_i)$$

The customization module can evaluate $\Delta G_{sd}$ for any given fit at the same set of frequency points, $\vec{f}$, used to construct the influence matrix, and can solve for the change in compensator parameters that satisfy this set of equations at all these frequency points. This can be achieved by inverting the influence matrix, which yields:

$$\Delta\Gamma_j = -\left[\left.\frac{\partial K_{fb}}{\partial \Gamma}\right|_{ij}\right]^{-1} \Delta G_{sd}(f_i)$$

In the case that the number of parameters in $\Delta G_{sd}$ and the number in $\Delta\Gamma_j$ differ, the inverse becomes a pseudo-inverse, which provides the least-squares optimal solution for the incremental change in filter parameter.

Determining the influence matrix involves significant computation, as does its inversion. However, this need only be done once for a given nominal feedback compensation filter and the inverted influence matrix stored in the customization module. The customization module is then able, having measured the deviation in ear response, to compute the necessary compensator adjustments relative to the nominal compensator to drive this particular fit to the target loop gain response with a single matrix multiplication. The process of doing the FFTs of the measured signals, determining the change in $G_{sd}$ from nominal, then multiplying that vector by the predetermined and stored inverted influence matrix, is efficient; it can be accomplished in processors such as, for example, ARM cores appropriate for use in wearable products in under one second.

Figures 5A, 5B, 5C:
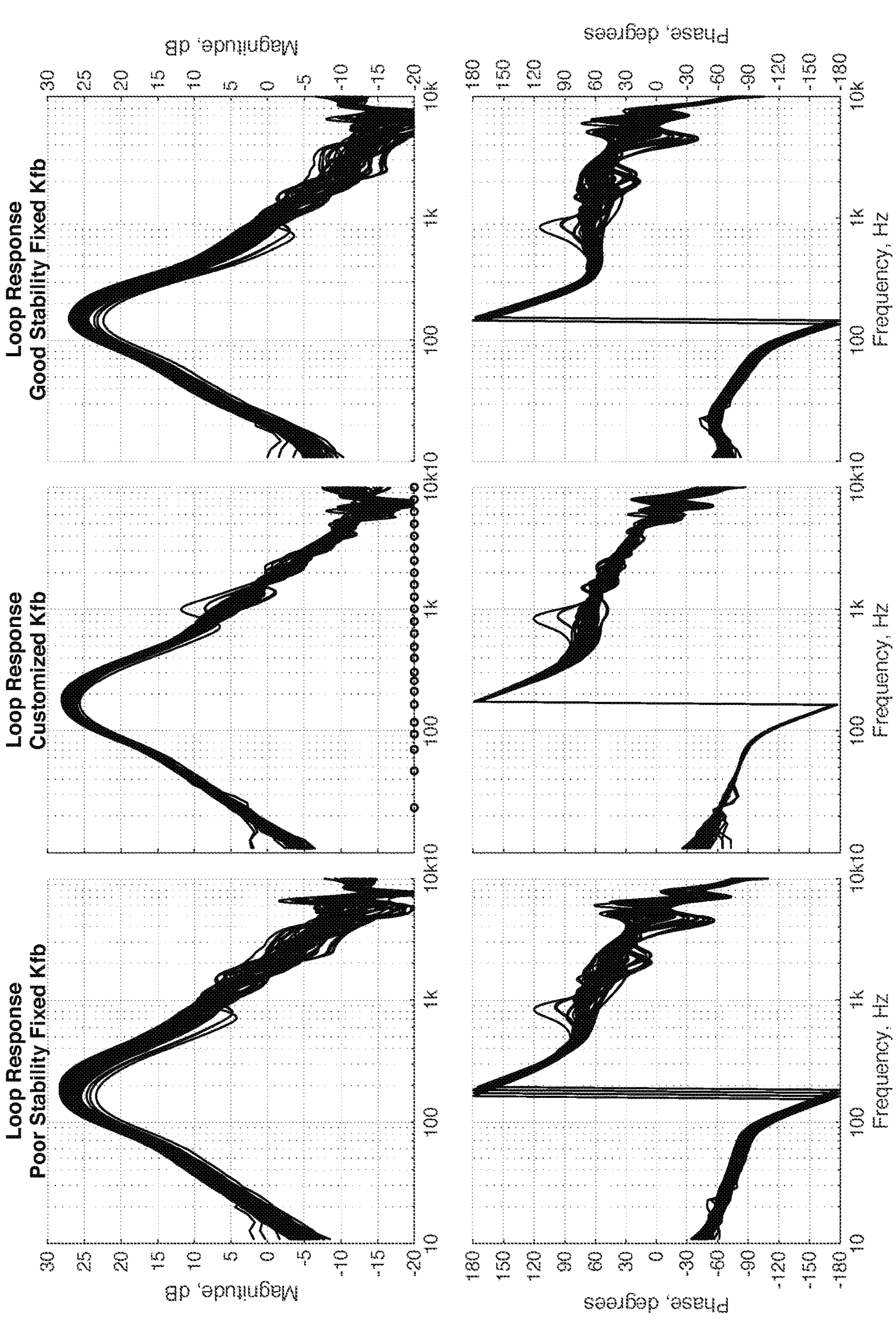
FIGS. 5A, 5B, and 5C are plots of magnitude and phase of example feedback loop responses.

FIGS. 5A-G illustrate the results of this perturbation solution in the customization of a feedback system for a system having fairly high acoustic potential cancellation, to approximately 2 kHz. FIG. 5A shows the loop response (loop gain and phase) for a training set of ears/donnings with a fixed feedback compensator $K_{fb}$ designed to achieve feedback loop high-frequency gain crossover of approximately 2 kHz, with the goal of achieving cancellation to the full potential of the earphone acoustics. Note, however, that the phase of the loop response is close to 0 degrees at gain crossover, indicating a system with poor feedback stability margin. FIG. 5B shows the result of training the system to customize $K_{fb}$ for each donning. The circular marks on the frequency axis of the upper magnitude plot in FIG. 5B are the set of frequencies that define the rows of the influence matrix. Note that a nearly 2 kHz loop magnitude crossover is achieved, that the range of variation of magnitude at each frequency is reduced and that the average phase at magnitude crossover is approximately 45 degrees. This is a system with good phase margin (good stability) based on magnitude and phase plots (also known as a Bode plot). FIG. 5C shows the same system with a fixed $K_{fb}$ modified—i.e., detuned—to achieve good stability margin. Note, however, that this detuning of $K_{fb}$ sacrifices performance, with the average magnitude crossover being approximately 900 Hz. Thus, for these high potential cancellation earphone acoustics, a fixed feedback compensator limits the cancellation that can be achieved, because of the effect of ear-to-ear $G_{sd}$ variation, particularly at higher frequencies.

Figures 5D, 5E, 5F, 5G:
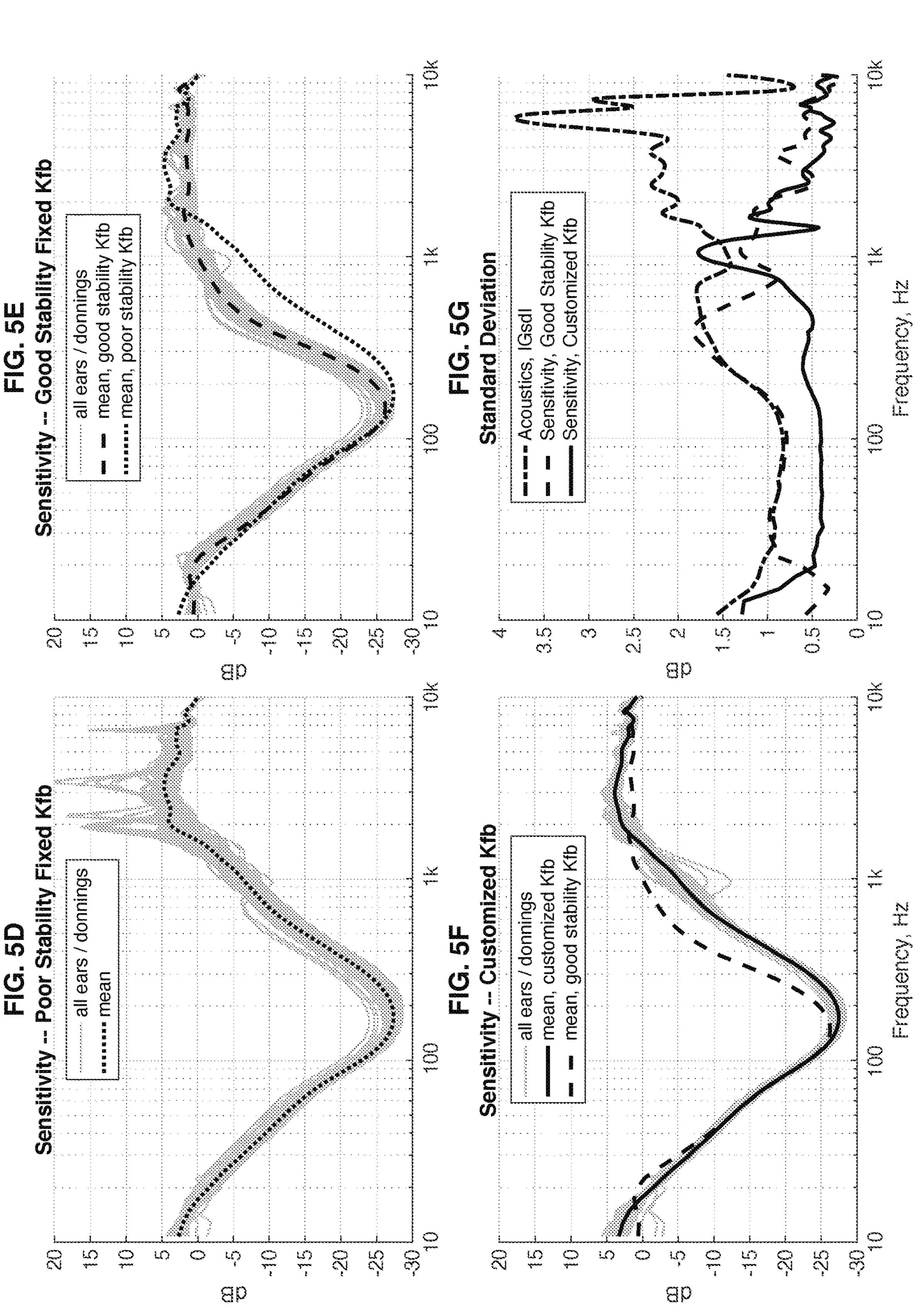
FIGS. 5D, 5E, 5F, and 5G are plots of example feedback loop sensitivity.

FIGS. 5D-F illustrate the performance of this same system, viewed in terms of its closed-loop performance: the feedback loop sensitivity, $$\text{Sensitivity} = \frac{1}{1 - K_{fb}G_{sd}}.$$

The sensitivity is the feedback noise cancellation (feedback insertion gain) as measured at the feedback microphone; for a system with sufficiently high potential cancellation it approximates the feedback insertion gain (FBIG) as measured in the ear canal. In a sensitivity plot, negative decibel values correspond to cancellation and positive decibel values correspond to amplification of noise. Values greater than 10 to 15 dB may indicate a system approaching oscillation. FIG. 5D shows the sensitivity for the poor stability fixed $K_{fb}$ system of FIG. 5A; note that, while the mean sensitivity (dotted line) is stable, for many donnings (gray/stippled lines) the sensitivity peaks in the 10 to 20 dB range. FIG. 5E shows the sensitivity for the good stability fixed $K_{fb}$ system of FIG. 5C; note that while, for all donnings, the sensitivity does not peak above 5 dB, the mean sensitivity (dashed line) has substantially given up cancellation performance as compared to the mean aggressive yet poor stability system (dotted line)—approaching a difference of 10 dB at some frequencies. Finally, FIG. 5F shows the sensitivity for the customized Kfb system of FIG. 5B; note that stability is good (gray individual donning curves barely exceed 5 dB) and the mean sensitivity (solid black line) has a sensitivity crossover frequency approaching 2 kHz, the potential cancellation of this system, and substantially better than the good stability fixed $K_{fb}$ system (dashed line).

One benefit of the increase in feedback loop bandwidth possible with high potential cancellation earphones that results from customization is improvement in the occlusion effect, the amplification of a wearer's voice that results from body conducted vibrations coupled into a blocked ear canal. For earphones that seal to the ear canal shallowly, at or near the canal aperture, occlusion is observed at frequencies below approximately 1.5 kHz. To a feedback noise cancellation system, occlusion amplified sounds originating in the body are noise to be cancelled. For the high potential cancellation system with stable fixed compensator of FIGS. 5C and 5E, the feedback loop bandwidth only extends to 900 Hz; this results in an odd sounding amplification of one's voice when one speaks while wearing the earphone. With the customization shown in FIGS. 5B and 5F, the feedback bandwidth is extended beyond 1.5 kHz, substantially improving the sound of a wearer's voice and thus, when in an 'aware' state, the sense of transparency.

For a fixed feedback compensator system, the variation in sensitivity at each frequency in the cancellation band (frequencies where loop gain is greater than 0 dB) will be essentially the variation in $G_{sd}$, the plant response. This is obvious from the equation for sensitivity, given that $K_{fb}$ is fixed. Since the sensitivity approximates the feedback insertion gain at the ear, an observable feature of an earphone implementing the techniques described herein is reduced variation in both sensitivity and feedback insertion gain in the cancellation band, as compared to the variation in the plant acoustics. FIG. 5G illustrates this for the system shown, with different $K_{fb}$ responses, in FIG. 5A-F. In FIG. 5G, the dash-dot line is the standard deviation over donnings at each frequency for the plant acoustics. The dashed line is the standard deviation for the sensitivity with the good stability fixed $K_{fb}$ system; note how, from 30 to 500 Hz the variation in sensitivity is substantially the same as the variation in plant response. The solid line is the standard deviation for the customized $K_{fb}$ system; note how over the majority of the cancellation band the variation is half or better than that of the underlying plant acoustics.

While the examples above describe customization of the feedback compensator $K_{fb}$, a similar approach can be used to determine a perturbation-based, customized feedforward compensator $K_{ff}$ for either the cancellation mode or the aware mode. The equation for IG given above can be solved, given a target IG such as 0 (cancellation) or 1 (aware), for the $K_{ff}$ that achieves it as a function of $K_{fb}$ and various acoustic responses measurable at the earphone's microphones as well as a microphone in the subjects' ear canals. The latter is possible in the laboratory as part of obtaining a training data set. The solution for $K_{ff}$ that results is the product of $N_{so}/G_{sd}$, times a term which includes factors pertaining to the feedback system and responses relating the system microphone and ear microphone signals. The latter term can be averaged over the training data. Thus, just as the perturbation method modifies $K_{fb}$ from a nominal response to customize for variation in $G_{sd}$ so as the achieve a more consistent (lower variation) wide bandwidth and better performing feedback loop response, the same methods (the pseudo-inverse of an influence matrix determined using a computationally intense and rigorous offline process from a set of training data) can be used to modify $K_{ff}$ from a nominal response, customizing for variation in $N_{so}/G_{sd}$, resulting in wider bandwidth and better performing total insertion gain (passive, feedback and feedforward combined).

Figure 5H:
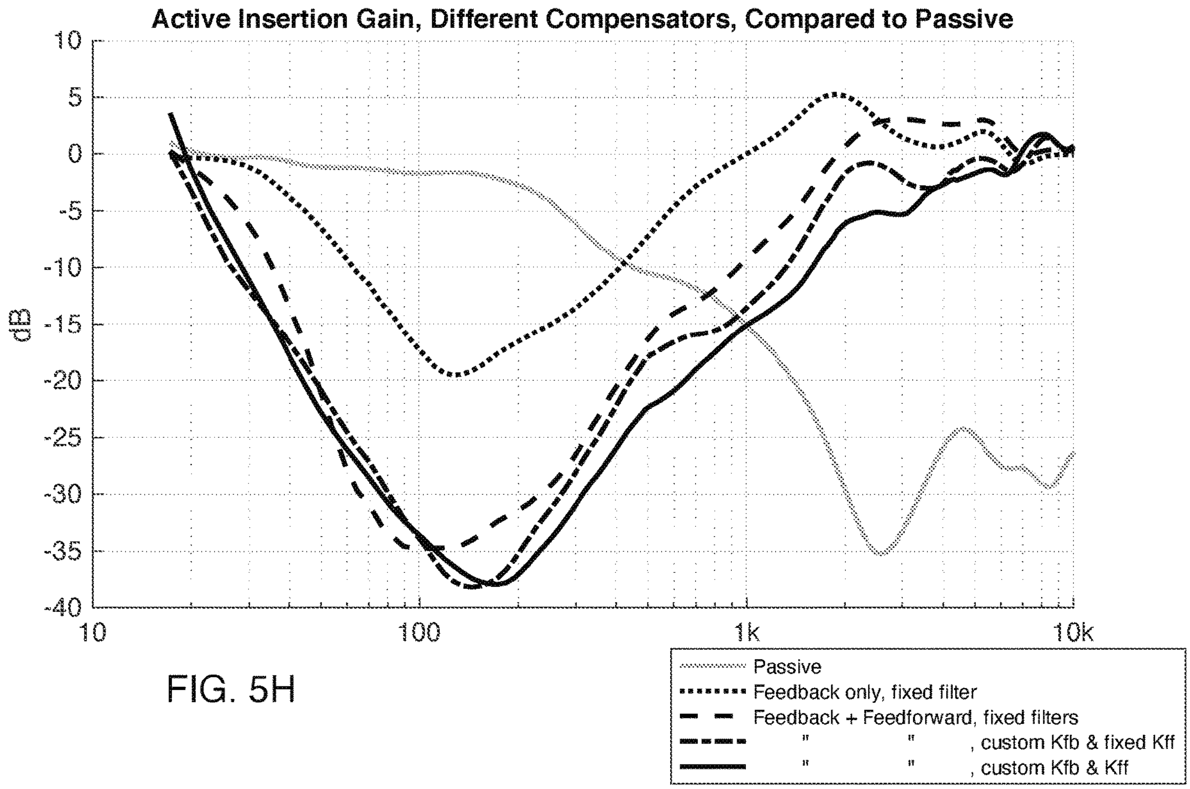
FIGS. 5H and 5I are plots of example insertion gain comparisons.
Figure 5I:
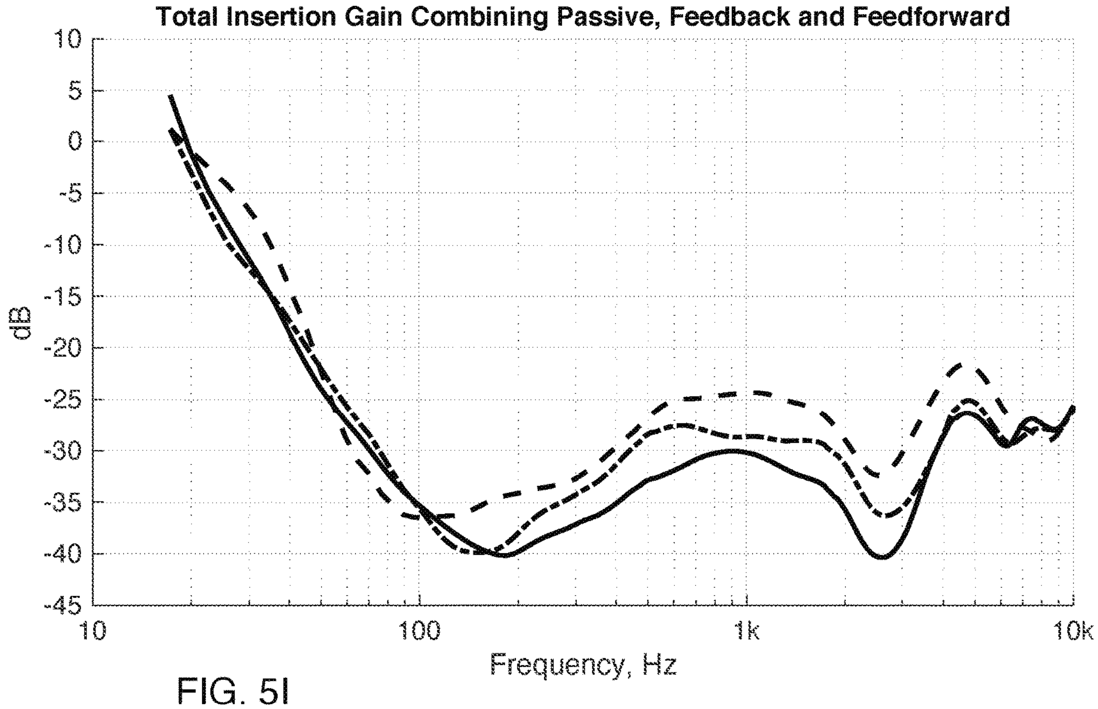

Customizing the feedback compensator using the techniques described herein can result in active insertion gains, combining the effects of both the feedback and feedforward systems, with bandwidths well in excess of 2 kHz, as shown in FIG. 5H. When this is combined with the additional bandwidth that results from customizing feedforward compensators, the combined active insertion gain bandwidth can exceed 2 kHz, as also shown in FIG. 5H. A shortcoming of active noise cancelling headphones since their inception has been that the active insertion gain crossover (the frequency at which cancellation is 0 dB) is lower than the frequency at which passive insertion gain plateaus, resulting in a 'hole' in total insertion gain at mid frequencies. With the additional bandwidth that results from customization this is no longer the case. As a result, as shown in FIG. 5I, total insertion gains in excess of 30 dB are possible at these mid frequencies important for the reduction of broadband noise and distracting voices.

In some implementations, the feedforward customization for a given ear/donning is performed after feedback customization for that ear/donning, and uses the result of the feedback customization for that ear/donning. This is desirable because the feedback customization provides a more consistent system as a foundation for the feedforward system. Alternatively, results of a previous feedback customization for a previous ear/donning for the same user may be used for feedforward customization for a given ear/donning.

After a suitable nominal data set comprising nominal functions and parameter values has been computed through an offline design process, the nominal dataset is loaded into memory of an earpiece or another portion of a wearable device accessible to an earpiece. A relatively small amount of memory may be used to store the nominal data set, which may include functions and parameters evaluated at a relatively small number of discrete frequencies, and an already-inverted influence matrix. Optionally, to enable operation before any customization has occurred, or with the ability to customize turned off, the memory can also store default filter parameters for the feedback and/or feedforward filters, which may be different from the nominal parameters. For example, while the nominal parameters will be adjusted to ensure they satisfy various constraints (e.g., stability constraints) for a given fit, the default parameters may be selected to ensure they satisfy those constraints for any of a variety of potential fits that may occur for a given user, in most cases with a sacrifice in performance.

Figure 6:
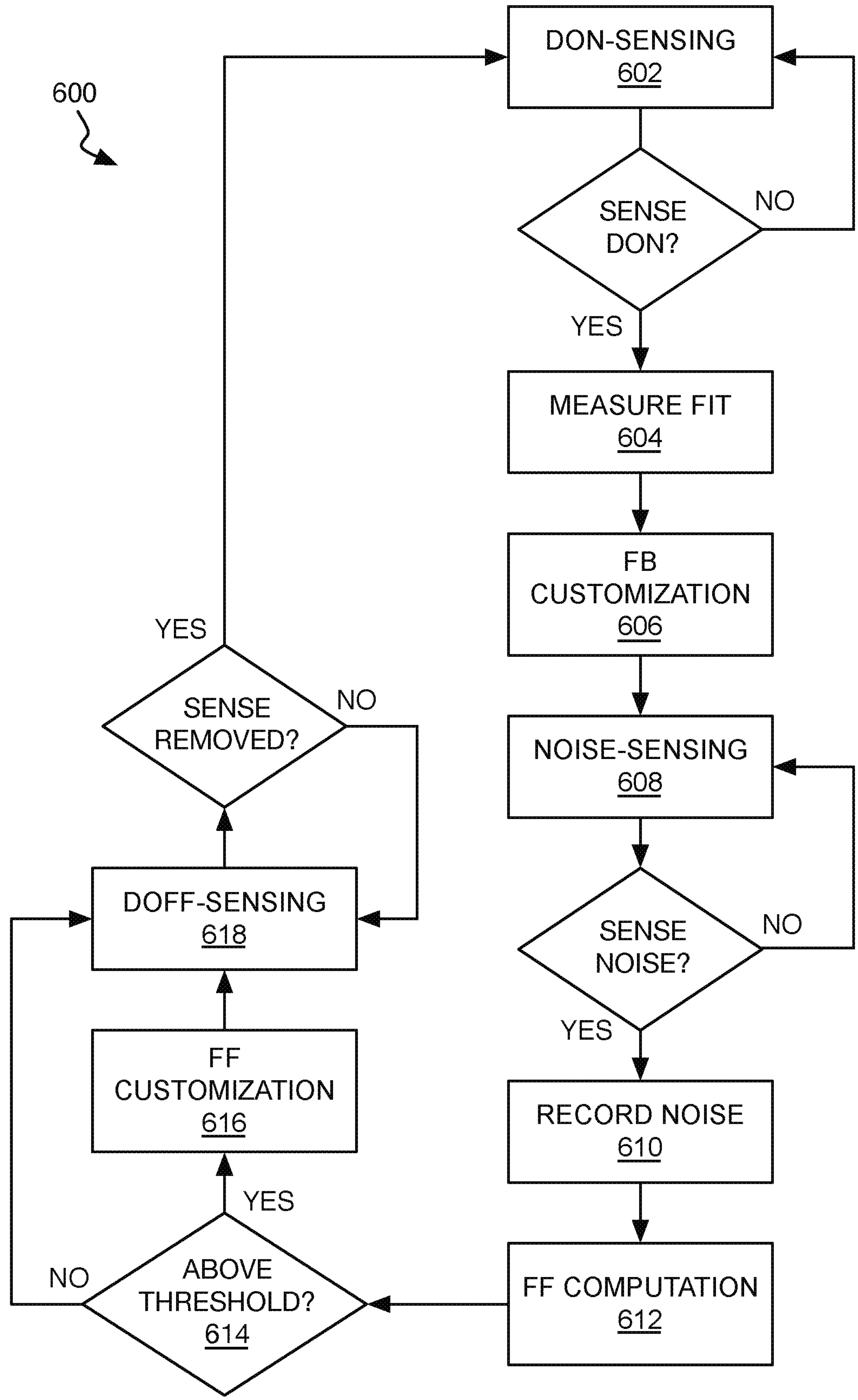
FIG. 6 is a flowchart of an example control procedure.

FIG. 6 shows a flowchart of an example control procedure 600 that the customization module uses to determine the circumstances in which the customization procedures are performed for customization of the feedback compensator, the feedforward compensator, or both. After an earpiece is powered on (e.g., when the wearable device is powered on), the control procedure 600 is in a don-sensing state 602 in which the customization module is able to sense that an earpiece has been donned by sensing that the earpiece has been placed in, on, or around an ear so that a fit is ready to be measured. This sensing may be performed, for example, using one or more sensors (e.g., skin touch sensor, proximity sensor, optical sensor, motion sensor, acoustic sensor, and/or pressure sensor). The control procedure 600 enables the customization module to measure 604 the acoustic characteristics of the earphone in the individual ear in which it has been placed during donning by playing a customization audio signal through an earpiece driver and recording a response signal sensed at a feedback microphone of the ANR circuitry, which is then used to trigger customization of the feedback compensator. The customization tone may be output independently in each earpiece (e.g., right and left earpieces), and the playback of the tone may be synchronized so that it is played at substantially the same time. In some cases, the customization tone may also be used to confirm that the user has a sufficient quality of fit or seal between the earpiece and his or her ear to proceed with customization.

The customization audio signal can be designed as a relatively short confirmation sound that is played through the audio drivers of each earpiece of the wearable device. This confirmation sound can serve as an indicator to the user that the earpieces of the wearable device have been worn as intended. To provide an appropriate measurement of the acoustic circumstances formed when the earpieces are worn, the spectrum of the customization audio signal can be shaped to include a sufficient amount of energy at a predetermined set of frequencies that will be used by the feedback customization procedure, said frequencies having been chosen based on the acoustic characteristics of the earphone in a typical ear (for example, to characterize the frequency of resonances and their maximum and minimum values). The user is not necessarily aware that a measurement will be performed, but may simply hear the confirmation sound as a normal part of the experience of wearing the wearable device. For example, the confirmation sound may be the "start-up" tone a user hears upon first donning and powering on the wearable device.

In an example of a customization audio signal, the duration of the signal can be relatively short (e.g., less than a second, or between about a tenth of a second and about a half a second) and the spectrum of the signal can include peaks centered at frequencies that correspond to harmonics of a fundamental low-frequency tone centered at a fundamental frequency. So, this fundamental frequency can be selected to correspond to the lowest frequency in the set of frequencies used by the customization procedure (e.g., 46.875 Hz). The next tones in the spectrum can be centered at frequencies that are higher harmonics (i.e., integer multiples of the fundamental frequency), with their spacing increasing approximately linearly for the first few harmonics, and then with the spacing gradually increasing by larger steps, but not necessarily monotonically increasing (e.g., multiples of 2, 4, 6, 8, 12, 16, 18, which correspond to the frequencies 93.75 Hz, 187.5 Hz, 281.25 Hz, 375 Hz, 562.5 Hz, 750 Hz, 843.75 Hz). As the frequencies increase, the energy level of each tone can be reduced (e.g., gradually reduced with respect to a log magnitude scale), but not necessarily monotonically reduced. The higher frequency tones in the spectrum (e.g., tones at frequencies above 1 kHz) may occur near approximate multiples of the fundamental frequency, but may not be as exact as the lower frequencies. For example, due to relaxed constraints at the higher frequencies, there may be some flexibility about the exact values of the center frequencies of the tones relative to the exact values of the high frequency harmonics of the fundamental frequency. The steps between the higher frequencies can also increase nonlinearly (e.g., exponentially, or as a function of the logarithm of frequency), but not necessarily by a constant function (e.g., higher-frequency tones may be centered at the frequencies 1031.3 Hz, 1218.8 Hz, 1500 Hz, 1781.3 Hz, 2156.3 Hz, 2531.3 Hz, 3000 Hz, 3562.5 Hz, 4218.8 Hz, 5062.5 Hz, 6000 Hz, 7125 Hz, 8531.3 Hz, 10125 Hz, 12000 Hz, 14250 Hz, 16969 Hz). In some implementations, there may be a preferred spacing between the higher frequencies (e.g., a quarter-octave spacing may be used). Alternatively, at higher frequencies, a low amplitude sine sweep or burst of band-limited pink noise. For example, a high frequency spectrum that is band-limited to frequencies greater than about 1 kHz, and relatively broadband above 1 kHz (instead of individual tones with peaks at selected frequencies), may be used.

While the customization audio signal is being played through the driver of each earpiece, the feedback microphone of each earpiece is used to receive a response signal that is a sensed version of that customization audio signal, which has been affected by the acoustic characteristics created by the combination of the earpiece with the individual ear canal's size, shape and tissue properties. For each earpiece, the samples of that received time domain response signal can be stored in a memory as a measure of said characteristics. The customization module then performs a feedback customization procedure 606 using that measured real-ear response data, as described in more detail below. After the feedback compensator has been customized, the control procedure 600 enters a noise-sensing state 608. The customization module monitors the sound level of the noise sensed by the feedforward microphone to determine whether to initiate customization of the feedforward compensator. If the sound level is low (i.e., lower than a predetermined threshold), then the control procedure 600 stays in the noise-sensing state 608. If the external sound level is not high enough, there may not be adequate information in any recorded signals. Also, if the external sound level is not high, there may not be as much need for customized feedforward performance. If the sound level is high (i.e., higher than the predetermined threshold), then the control procedure 600 enables the customization module to record 610 the noise, both as present in the external acoustic environment through the feedforward microphone of the ANR circuitry, and as present in the internal acoustic environment through the feedback microphone of the ANR circuitry. In some examples, in addition to waiting until the external sound level is high enough, customization of the feedforward compensator may not occur until the system detects that there is no audio signal being played through the electroacoustic transducer in the earpiece and/or that the user is not speaking. The customization module may store the recorded samples of the two signals for a given earpiece in the memory of that earpiece. The duration of the recorded signals may be relatively short (e.g., less than a second, or about a half a second) or may be averaged by various time- or frequency-domain means over longer intervals to improve the quality of the measurement. While signals sensed at the microphones are being recorded, for open-loop measurement no signal is played through the drivers of the earpieces, or for closed-loop measurement predetermined signals are played through the drivers. In addition to detecting the ambient sound level as part of a decision when to do the noise sensing, the noise-sensing state 608 may in addition check the level of signals at both feedback and feedforward microphones, and possibly also accelerometers in the earphone, to determine if the wearer of the earpiece is speaking. Noise recording 610 is best not done when the wearer is speaking since the occlusion effect causes a high level of signal at the feedback microphone and thus a recording that does not characterize the transmission of sound $N_{so}$ through and past the earphone into the ear with desirable accuracy. Whether consideration of the wearer's speaking state is necessary may, in addition, depend on the noise level, acoustical design of the earphone and state of feedback operation at the time of the recording.

In examples where the external sound level is not sufficient to trigger customization of the feedforward compensator, a user might be directed to generate noise in an environment where he or she is able to do so. For example, the user could be directed to generate audio from an external device, such as a phone, home speaker, portable speaker, or home theater system. The audio could contain background noise with spectral content sufficient to customize the feedforward compensator.

After the noise signals are recorded, the customization module performs a feedforward customization computation 612 using the recorded noise signals; this may in addition also include factoring in the previously measured and computed feedback customization ($G_{sd}$ and $K_{fb}$). However, the step of customizing the feedforward compensator may not be performed in certain circumstances. In this example implementation, the control procedure 600 checks to determine if a measure of a relative change between the resulting customized feedforward compensator parameters and the presently loaded feedforward compensator parameters is large enough by comparing 614 the measure to a predetermined threshold. If the measure is above the threshold, then the control procedure 600 enables the customization module to perform the feedforward customization procedure 616 using the results of the feedforward customization computation 612. If the measure is not above the threshold, then the control procedure 600 does not change the feedforward compensator parameters that are currently in use. This ensures that the user does not unnecessarily experience a change in ANR performance. Alternatively, the customization module can accumulate results of the noise recording and related data, for example in the form of distinct measurements of $N_{so}/G_{sd}$ over time and even over multiple donnings of the earpiece. The earpiece can then, in turn, analyze the statistics of these in various ways, including averaging, to determine an ever-improving estimate of the $K_{ff}$ that is best for the wearer.

After determining whether or not any triggered feedforward customization is to be applied, the control procedure 600 enters a doff-sensing state 618 in which the customization module is able to sense that an earpiece has been removed by sensing that the earpiece is no longer placed in, on, or around an ear. This sensing may be performed, for example, using one or more sensors (e.g., skin touch sensor, proximity sensor, motion sensor, acoustic sensor, and/or pressure sensor). If the earpiece is not removed, then the control procedure 600 stays in the doff-sensing state 618. When the earpiece is doffed, then the control procedure 600 returns to the don-sensing state 602 to perform new customization for a new user and/or a new fit. In some cases, the new customization may not be triggered if the user only removes the earpiece for a less than threshold amount of time, e.g., several seconds. For the feedforward customization, the earpiece may optionally trigger a new customization when the user of the earpiece is in an environment where the feedforward customization could be improved by automatically triggering the customization or prompt the user to do so.

This example control procedure 600 is just one example of techniques for initiating customization of the feedback compensator and/or feedforward compensator. In one alternative example, the procedure shown in 600 could be followed but a step added that compares the $G_{sd}$ resulting from 604 to a stored value determined in prior measurements, and if it sufficiently matches a previously stored value (an acoustic 'earprint') then previously determined compensator filters may be used instead, eliminating the need to do additional measurements and filter customization. In a second alternative, the owner of the earpiece could be directed, after unboxing the product after purchase, by an associated app or voice prompts issued by the customization module to go through a sequence of measurements to obtain compensator filters for that user; these filters would then be stored for all subsequent use sessions. In this second alternative, the initiation of the measurements may be manually triggered and, in addition, an 'earprint' may also be used to trigger use of the stored compensator filters. In any of these examples, if the product is in use and oscillation of the feedback system is detected by some means, the system could be very quickly switched to an open loop mode of operating and the measurement triggered. Other alternative sequences of steps to customize the system are possible, as well as various combinations of the alternatives described above.

Different implementations of the customization procedure may perform different steps and/or different computations depending on whether the feedback compensator is being customized or the feedforward compensator is being customized.

In some implementations, other forms of input can be used to trigger the customization procedure or other adjustments to the loop gain or other characteristics of the ANR circuitry. For example, adjustments can be made in response to detecting onset of instability in the feedback loop or in response to detecting a significant pressure change, which may be an indication of a significant change in the fit of an earpiece. As another example, when a worse than typical or expected seal is detected, the target loop gain can be reduced.

Different implementations of the customization procedure may perform different steps and/or different computations depending on whether a wearable audio device has earpieces that are configured to be worn in the ear, on the ear, or around the ear. For example, for customization procedures for an on-ear or around-ear fit, there may be relatively more focus placed on modifying compensators at lower frequencies due to leakage associated with a poor fit on or around the ear, which may primarily impact relatively lower frequencies. Alternatively, for customization procedures for an in-ear fit, there may be additional focus placed on modifying compensators at higher frequencies due to fit-to-fit variation from close coupling to different ear canal sizes and/or shapes, which may primarily impact relatively higher frequencies. In some implementations, for any of in-ear, on-ear, or around-ear fits, the customization of a compensator may be made over a relatively broadband frequency range (e.g., 20 Hz to 10 kHz), which may extend both above and below a gain crossover frequency of the feedback loop. For example, the customization of the compensator may modify one or more parameters associated with one or more frequencies that are below a high-end gain crossover frequency, where a magnitude of loop gain associated with the ANR signal path (i.e., the feedback or feedforward path) is approximately equal to one, as well as modify one or more parameters associated with one or more frequencies that are above the high-end gain crossover frequency. The customization may also enable the gain crossover frequency to be relatively high, yielding a feedback loop that is stable over a broad range of frequencies. For example, with customization, a low-end gain crossover frequency may be around 20 Hz, and a high-end gain crossover frequency may be over 1 kHz (e.g., around 2 kHz or around 3 kHz). Without customization, the high-end gain crossover frequency may be purposely limited to under around 800 Hz or 700 Hz to ensure stability for a large variety of users and/or fits.

In some implementations, the number of parameters of the compensator being customized is relatively large. For example, for a feedback compensator that is implemented using cascaded biquad filters, there may be three, or four, or more biquad filters, leading to 12, or 16 or more parameters in the parameter vector (assuming each biquad filter is characterized by at least 4 parameters), enabling a significant level of customization for the customized ANR.

A wearable device may also be configured to use customization information, such as filter parameters obtained from the customization procedure for a variety of purposes. For example, since the feedback filter parameters are expected to be different for different users and relatively consistent for a particular user if that user wears the device with earpiece(s) fit in a particular manner, the feedback filter customization information could be used to identify or authenticate a user. The feedback filter parameters, or the deviation from nominal of the plant $G_{sd}$, could be used as, or used to compute or look up, an identification code. While measurements from a single earpiece could be used, the combination of the parameters from the left and right ears, which are not identical, increases the level of uniqueness of this 'earprint'. The earprint left/right combined $G_{sd}$ or filter parameters may in addition be combined with other information such as, for example, the formant structure of the wearer's voice as they speak or say their name, to further increase the uniqueness of the user identification. In response to a particular identification code, the audio characteristics of the wearable device could be tuned (e.g., for a particular equalization setting, or for pre-loading a particular filter or changing some other mode of headphone operation).

This identification code could also be used by some means, such as over a Bluetooth link, to uniquely identify a user to unlock other systems such as the user's computer, servers and to unlock doors and vehicles.

The customization procedure described is computationally efficient to implement since, in addition to the response measurements, it is sufficient to store an inverted (or pseudo-inverted) influence matrix. The computation to determine the nominal filter and the inverted influence matrix is done offline and can involve time consuming, computationally intense methods. Alternatives to this method are possible. In one alternative, the measurements performed by the linear perturbation method could be made at unboxing of the product, manually triggered by the user and guided by an app or voice prompts. These measurements could be uploaded to a server where standard fitting and optimization tools, such as those available in the Signal Processing Toolbox offered by The Mathworks, to determine compensators that adjust the measured acoustics to achieve target performance. These filters could then be downloaded from the server and stored in the product for subsequent use. Multiple people who share an earphone could go through this process, with each of their filters determined by the server-based computation being stored, to be selected based on the earprint measured when the headphone is donned. A second alternative forgoes the linearization of the relationship between filter parameters and changes in magnitude and phase used in the perturbation method. Instead, having determined the nominal compensation filters $K_{fb}$ and $K_{ff}$ that the system designer deems optimal for the earphone, the parameters defining those filters can be varied and the corresponding variation in magnitude and phase determined over a range beyond which the linear approximation is accurate. Then a multi-dimensional nonlinear surface relating the magnitude and phase changes from nominal (as independent variables) to the changes in filter parameters (as dependent variables) may be fit. The equations describing this surface could then be stored in the customization module for use in customizing the filters at each donning. A third alternative, given the nominal compensation filters optimal for an earphone and a large training data set comprised of varying filter parameters and the corresponding filter response (magnitude and phase) changes, is to train a deep neural network (DNN) to predict filter parameter changes from response changes. Once trained, the DNN can be implemented in the customization module to determine customized filters from the response measured for a given donning. In recent years, DNNs have shown great utility in modeling systems previously intractable for deterministic mathematical solutions. An advantage of applying DNNs to this problem is that the data set needed to train the DNN (the filter changes and corresponding response changes) can be made arbitrarily large and to span larger deviations in filter parameters than the linearized perturbation method can handle.

While the examples described herein includes a single feedback microphone and a single feedforward microphone for each earpiece, in other examples, additional feedback microphones and/or feedforward microphones can be used. The ANR circuitry can be included in the earpieces (e.g., for wireless earbuds), and/or in a wired control module (e.g., for wired earbuds), or in a remote module that is in communication with one or both of the earpieces (e.g., through a wired or wireless link). Any or all of the ANR circuitry can be implemented using specialized hardware modules, and/or processors configured to execute software stored on a non-transitory computer-readable medium for performing any of the computations of the ANR circuitry, and the circuitry can be configured as described, for example, in U.S. Patent Publication No. 2013/0315412, and U.S. Patent Publication No. 2016/0267899, each of which is incorporated herein by reference.

While the disclosure has been described in connection with certain examples, it is to be understood that the disclosure is not to be limited to the disclosed examples but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

in response to sensing that an earpiece of an active noise reduction (ANR) headphone has been positioned in, on, or around the ear:

(i) receiving a first input signal captured by one or more sensors associated with the ANR headphone;

(ii) computing, by one or more processing devices, a frequency domain representation of the first input signal for a set of discrete frequencies;

(iii) generating, by the one or more processing devices based on the frequency domain representation of the input signal, a set of parameters for a digital filter disposed in an ANR signal flow path of the ANR headphone; and (iv) processing a second input signal in the ANR signal flow path using the generated set of parameters to generate an output signal for driving the electroacoustic transducer of the ANR headphone.

2. The method of claim 1, wherein:

the first input signal is captured responsive to delivering an audio signal through an electroacoustic transducer of the ANR headphone, the audio signal comprising a wideband signal that includes energy at a plurality of the frequencies in the set of discrete frequencies, and the frequency domain representation of the first input signal is indicative of a response of an ear to the audio signal.

3. The method of claim 2, wherein the audio signal has a spectrum that comprises 10 or more tones centered at predetermined frequencies between about 45 Hz-16 kHz.

4. The method of claim 3, wherein the predetermined frequencies comprise at least one frequency below 50 Hz and at least one frequency above 15 kHz.

5. The method of claim 3, wherein the predetermined frequencies comprise a plurality of frequencies above 1 kHz that have spacing less than or equal to ¼-octave.

6. The method of claim 2, wherein the audio signal is delivered automatically in response to sensing that the ANR headphone has been positioned in, on, or around a user's ear.

7. The method of claim 1, wherein the one or more sensors comprise a feedback microphone of the ANR headphone, and the ANR signal flow path comprises a feedback path disposed between the feedback microphone and the electroacoustic transducer.

8. The method of claim 1, wherein generating the set of parameters comprises:

accessing a nominal set of parameters for the digital filter, determining, based on the frequency domain representation of the first input signal, a set of correction parameters, and generating the set of parameters as a combination of the nominal set of parameters and corresponding parameters in the set of correction parameters.

9. The method of claim 8, wherein the nominal set of parameters are computed based on training data comprising a plurality of ear responses.

10. The method of claim 9, wherein the nominal set of parameters are generated by executing an optimization process configured to generate the parameters for a corresponding ear response.

11. The method of claim 10, wherein determining the set of correction parameters comprises:

computing a loop gain for the nominal set of parameters of the digital filter;

generating an error vector comprising deviations of the loop gain at different frequencies from a corresponding target loop gain; and generating the set of correction parameters as the output of the optimization process based on statistics of the training data.

12. The method of claim 1, further comprising storing the generated set of parameters for identifying or authenticating a user.

13. The method of claim 1, wherein generating the set of parameters comprises:

adjusting a response of the digital filter at frequencies that span at least frequencies between about 200 Hz to about 5 kHz; and adjusting a response of at least 3 second order sections of the digital filter.

14. A method comprising:

in response to sensing an ambient noise level in a vicinity of an active noise reduction (ANR) headphone being above a predetermined threshold:

(i) receiving a first input signal captured by one or more sensors associated with the ANR headphone;

(ii) computing, by one or more processing devices, a frequency domain representation of the first input signal for a set of discrete frequencies;

(iii) generating, by the one or more processing devices based on the frequency domain representation of the input signal, a set of parameters for a digital filter disposed in an ANR signal flow path of the ANR headphone; and (iv) processing a second input signal in the ANR signal flow path using the generated set of parameters to generate an output signal for driving the electroacoustic transducer of the ANR headphone.

15. The method of claim 14, wherein the one or more sensors comprise a feedforward microphone of the ANR headphone, and the ANR signal flow path comprises a feedforward path disposed between the feedforward microphone and the electroacoustic transducer.

16. The method of claim 15, wherein the one or more sensors further comprise a feedback microphone of the ANR headphone, and the first input signal comprises a ratio of a feedback microphone signal and a feedforward microphone signal.

17. The method of claim 16, wherein the feedback microphone signal is captured responsive to delivering an audio signal through the electroacoustic transducer of the ANR headphone, the audio signal comprising a wideband signal that includes energy at a plurality of the frequencies in the set of discrete frequencies.

18. The method of claim 16, wherein one or both of the feedforward microphone signal and the feedback microphone signal are captured repeatedly at each of a plurality of time intervals.

19. The method of claim 14, wherein generating the set of parameters comprises:

accessing a nominal set of parameters for the digital filter, determining, based on the frequency domain representation of the first input signal, a set of correction parameters, and generating the set of parameters as a combination of the nominal set of parameters and corresponding parameters in the set of correction parameters.

20. The method of claim 19, wherein the nominal set of parameters are computed based on training data comprising a plurality of ear responses.

21. The method of claim 20, wherein the nominal set of parameters are generated by executing an optimization process configured to generate the parameters for a corresponding ear response.

22. The method of claim 21, wherein determining the set of correction parameters comprises:

computing a loop gain for the nominal set of parameters of the digital filter;

generating an error vector comprising deviations of the loop gain at different frequencies from a corresponding target loop gain; and generating the set of correction parameters as the output of the optimization process based on statistics of the training data.

23. The method of claim 14, further comprising storing the generated set of parameters for identifying or authenticating a user.

24. The method of claim 14, wherein generating the set of parameters comprises:

adjusting a response of the digital filter at frequencies that span at least frequencies between about 200 Hz to about 5 kHz; and adjusting a response of at least 3 second order sections of the digital filter.

* * * * *